(12) United States Patent
Wu et al.

(10) Patent No.: US 11,109,269 B2
(45) Date of Patent: Aug. 31, 2021

(54) PACKET FORWARDING METHOD AND APPARATUS

(71) Applicant: Huawei Technologies Co., Ltd., Shenzhen (CN)

(72) Inventors: Yuefeng Wu, Nanjing (CN); Yifan Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/426,808

(22) Filed: May 30, 2019

(65) Prior Publication Data

US 2019/0281495 A1  Sep. 12, 2019

Related U.S. Application Data

(63) Continuation of application No. PCT/CN2017/088532, filed on Jun. 15, 2017.

(30) Foreign Application Priority Data

Nov. 30, 2016 (CN) .......................... 201611094695.X

(51) Int. Cl.
*H04W 28/06* (2009.01)
*H04W 4/80* (2018.01)
(Continued)

(52) U.S. Cl.
CPC ............. *H04W 28/06* (2013.01); *H04L 45/66* (2013.01); *H04L 45/741* (2013.01);
(Continued)

(58) Field of Classification Search
CPC ........ H04W 28/06; H04W 4/80; H04L 45/66; H04L 45/741; H04L 45/745; H04L 61/6059
See application file for complete search history.

(56) References Cited

U.S. PATENT DOCUMENTS

2003/0198226 A1* 10/2003 Westberg ................ H04L 29/06
                                                           370/393
2004/0264451 A1* 12/2004 Kujala ................ H04L 61/6022
                                                           370/389
(Continued)

FOREIGN PATENT DOCUMENTS

CN       102421162 A      4/2012
CN       105763455 A      7/2016
(Continued)

OTHER PUBLICATIONS

Machine Translation and Abstract of Chinese Publication No. CN105991555, Oct. 5, 2016, 12 pages.
(Continued)

*Primary Examiner* — Jael M Ulysse
(74) *Attorney, Agent, or Firm* — Conley Rose, P C.

(57) ABSTRACT

A network node encapsulates an IPv6 packet into a data frame including a layer-2 forwarding header and a MAC header, where the data frame includes a 6LoWPAN compressed IPv6 packet, and the layer-2 forwarding header and the MAC header are located in an outer layer of the 6LoWPAN compressed IPv6 packet. The network node obtains a MAC address of a next-hop node based on a final MAC address in the layer-2 forwarding header, and sends the data frame to the next-hop node, so that the next-hop node forwards the data frame directly based on the layer-2 forwarding header.

20 Claims, 6 Drawing Sheets

(51) Int. Cl.
  *H04L 12/749* (2013.01)
  *H04L 12/741* (2013.01)
  *H04L 29/12* (2006.01)
  *H04W 72/04* (2009.01)
  *H04W 80/02* (2009.01)
  *H04L 12/721* (2013.01)
  *H04W 84/18* (2009.01)

(52) U.S. Cl.
  CPC ........ *H04L 45/745* (2013.01); *H04L 61/6059* (2013.01); *H04W 4/80* (2018.02); *H04W 72/0446* (2013.01); *H04W 80/02* (2013.01); *H04W 84/18* (2013.01)

(56) References Cited

U.S. PATENT DOCUMENTS

| | | | | |
|---|---|---|---|---|
| 2009/0185549 | A1* | 7/2009 | Shon | H04L 69/22 370/349 |
| 2009/0279536 | A1* | 11/2009 | Unbehagen | H04L 45/00 370/352 |
| 2010/0202355 | A1* | 8/2010 | Kim | H04W 36/385 370/328 |
| 2010/0202357 | A1* | 8/2010 | Kim | H04L 63/0892 370/328 |
| 2010/0260146 | A1* | 10/2010 | Lu | H04L 12/4633 370/331 |
| 2012/0213098 | A1 | 8/2012 | Sun | |
| 2012/0287932 | A1* | 11/2012 | Haddad | H04L 45/04 370/392 |
| 2013/0070745 | A1* | 3/2013 | Nixon | H04L 45/74 370/338 |
| 2013/0215810 | A1* | 8/2013 | Wang | H04W 4/80 370/311 |
| 2013/0235862 | A1* | 9/2013 | Kahng | H04L 61/103 370/338 |
| 2015/0207772 | A1* | 7/2015 | Walker | H04L 69/18 370/392 |
| 2016/0043942 | A1* | 2/2016 | Purohit | H04W 40/244 370/338 |
| 2016/0149856 | A1* | 5/2016 | Hui | H04L 45/74 370/252 |
| 2017/0149614 | A1* | 5/2017 | Zheng | H04L 63/101 |

FOREIGN PATENT DOCUMENTS

| | | |
|---|---|---|
| CN | 105991555 A | 10/2016 |
| WO | 2012059821 A1 | 5/2012 |

OTHER PUBLICATIONS

Foreign Communication From a Counterpart Application, PCT Application No. PCT/CN2017/088532, English Translation of International Search Report dated Aug. 30, 2017, 2 pages.
Foreign Communication From a Counterpart Application, PCT Application No. PCT/CN2017/088532, English Translation of Written Opinion dated Aug. 30, 2017, 4 pages.
Hinden, R., et al., "IP Version 6 Addressing Architecture," XP015008157, RFC 2373, Jul. 1998, 27 pages.
Foreign Communication From a Counterpart Application, European Application No. 17876095.5, Extended European Search Report dated Jul. 19, 2019, 9 pages.
Ahmood, D., "Analyzing and Evaluating Contention Access Period of Slotted CSMA/CA for IEEE802.15.4," Procedia Computer Science vol. 34, 2014, pp. 204-211.

* cited by examiner

PACKET FORWARDING METHOD AND APPARATUS

CROSS-REFERENCE TO RELATED APPLICATIONS

This application is a continuation application of Int'l Patent App. No. PCT/CN2017/088532 filed on Jun. 15, 2017, which claims priority to Chinese Patent App. No. 201611094695.X filed on Nov. 30, 2016, which are incorporated by reference.

TECHNICAL FIELD

The present disclosure relates to the field of communications technologies, and in particular, to a packet forwarding method and apparatus.

BACKGROUND

A low-rate wireless mesh network is one of current influential Internet of Things technologies, and is widely applied to fields such as smart metering and smart household. Generally, the low-rate wireless mesh network is constructed by using the Institute of Electrical and Electronics Engineers (IEEE) 802.15.4 protocol in combination with the Internet Protocol version 6 (IPv6) over Low-Power Wireless Personal Area Network (6LoWPAN) protocol. The IEEE 802.15.4 protocol specifies a physical layer and a link layer for a low-rate wireless personal area network (LR-WPAN). Because IEEE 802.15.4 specifies that each frame should not include more than 127 bytes, to carry an IPv6 packet including a minimum of 1280 bytes, an IPv6 packet header compression mechanism and a packet fragmentation mechanism defined in the 6LoWPAN protocol can allow IPv6 to run seamlessly on the LR-WPAN based on IEEE 802.15.4.

In addition, to implement network security, an IPv6 packet in the low-rate wireless mesh network may be encrypted for transmission. A link-layer Advanced Encryption Standard (AES)-128 defined in IEEE 802.15.4 is also widely applied to the low-rate wireless mesh network. Therefore, for an IPv6 packet exchanged in the low-rate wireless mesh network, a format of a data frame after the IPv6 packet is encapsulated is shown in FIG. 1. A medium access control (MAC) header is a link-layer frame header defined in the IEEE 802.15.4 protocol, and includes a frame control field, a sequence number, and an address field. An appended security header is a header appended after the packet is encrypted according to a data link layer encryption mechanism provided by the IEEE 802.15.4 protocol. The security header includes a security level, a frame counter, a key index, and the like. A 6LoWPAN compressed header is a header appended after the IPv6 packet is compressed according to a 6LoWPAN compression mechanism. An inner IP field is a field not compressed in an IPv6 packet header, and may include a minimum of 0 bytes. A message integrity code (MIC) is a message integrity check code defined in IEEE 802.15.4, and may be 0 bytes. The MIC is used to carry authentication information. A receiver determines, by performing authentication calculation on same data and comparing MIC values, whether the data frame is tampered. A frame check sequence (FCS) is a frame check sequence defined in IEEE 802.15.4.

Because the IPv6 packet is encapsulated into the data frame after being compressed and encrypted in the low-rate wireless mesh network, after a node receives the data frame, the node needs to first perform decryption and decompression processing to obtain the IPv6 packet. Then, the node looks up a layer-3 routing table based on a destination IPv6 address of the IPv6 packet to obtain a next hop, and then performs compression and encryption on the packet to encapsulate the packet into a data frame for sending to the next hop. However, many nodes in the low-rate wireless mesh network are low-cost devices using micro control units (MCUs), and frequent encryption/decryption and compression/decompression may consume a large quantity of computing resources. In addition, for a node that uses a battery as a power supply, the power supply is also consumed quickly and a service life of the power supply is shortened.

SUMMARY

This application provides a packet forwarding method and apparatus. A network node in a low-rate wireless mesh network encapsulates an IPv6 packet into a data frame including a layer-2 forwarding header; and an intermediate forwarding node can directly perform layer-2 forwarding on the data frame based on the layer-2 forwarding header, instead of performing layer-3 routing based on a destination IPv6 address of the IPv6 packet. This improves forwarding efficiency, and can avoid consumption of processing resources and power caused when decompression is performed hop by hop to obtain the destination IPv6 address and then compression processing is performed in a packet forwarding process.

According to a first aspect, a packet forwarding method is provided and applied to a low-rate wireless mesh network, where the method includes: obtaining, by a network node, an original MAC address based on a source IPv6 address of an IPv6 packet, and obtaining a final MAC address based on a destination IPv6 address of the IPv6 packet, where the original MAC address is a MAC address of the network node, and the final MAC address is a MAC address of a final node; obtaining, by the network node, a MAC address of a next-hop node based on the final MAC address; generating, by the network node, a data frame based on the IPv6 packet, that is, performing, by the network node, encapsulation processing on the IPv6 packet to generate the data frame, where the data frame includes a MAC header and a layer-2 forwarding header, the layer-2 forwarding header includes the original MAC address and the final MAC address, the MAC header includes a source MAC address and a destination MAC address, the source MAC address is the MAC address of the network node, the destination MAC address is the MAC address of the next-hop node, the data frame further includes a 6LoWPAN compressed IPv6 packet, the MAC header and the layer-2 forwarding header are located in an outer layer of the 6LoWPAN compressed IPv6 packet (even a 6LoWPAN compressed IPv6 packet after data link layer encryption is performed according to IEEE 802.15.4), and the source MAC address and the destination MAC address in the MAC header change hop by hop in a forwarding process, but the original MAC address and the final MAC address in the layer-2 forwarding header remain unchanged in the forwarding process; and sending, by the network node, the data frame to the next-hop node, so that the next-hop node forwards the data frame directly based on the final MAC address in the layer-2 forwarding header instead of the destination IPv6 address that undergoes compression (even encryption) processing. Therefore, an original node in the low-rate wireless mesh network obtains the corresponding original MAC address and final MAC address based on the source IPv6 address and the destination IPv6 address of the IPv6 packet, and puts the original MAC address and the final MAC address in the layer-2 forwarding header that does not undergo compression (even encryption) processing in the outer layer of the IPv6 packet. When receiving the data frame, an intermediate node can directly obtain the final MAC address in the layer-2 forwarding header to perform layer-2 forwarding, and there is no need to perform decompression (optional decryption) processing on the data frame to obtain the destination IPv6 address of the IPv6 packet and perform layer-3 routing. This improves forwarding efficiency, and further avoids consumption of a large quantity of resources caused when decompression (or decryption and decompression) is performed hop by hop and then compression (or compression and encryption) processing is performed in the IPv6 packet forwarding process.

In a first possible implementation of the first aspect, the MAC header may further include a layer-2 forwarding header identifier, used to indicate whether the data frame includes the layer-2 forwarding header. Therefore, after receiving the data frame, a node in the low-rate wireless mesh network can correctly obtain the layer-2 forwarding header based on the identifier, and perform layer-2 forwarding on the data frame based on the layer-2 forwarding header.

With reference to the first aspect or the first possible implementation of the first aspect, in a second possible implementation of the first aspect, the encapsulating, by the network node, the IPv6 packet to generate a data frame includes: compressing, by the network node, the IPv6 packet according to the 6LoWPAN protocol, and encapsulating a 6LoWPAN compressed header to obtain the 6LoWPAN compressed IPv6 packet, where the 6LoWPAN compressed header includes a source address compression flag and a destination address compression flag, the source address compression flag is used to indicate whether the source IPv6 address is compressed, and the destination address compression flag is used to indicate whether the destination IPv6 address is compressed; and encapsulating, by the network node, the layer-2 forwarding header and the MAC header in the outer layer of the 6LoWPAN compressed IPv6 packet to obtain the data frame.

With reference to the second possible implementation of the first aspect, in a third possible implementation of the first aspect, the compressing, by the network node, the IPv6 packet according to the 6LoWPAN protocol includes: when the source IPv6 address is an address of a node in the low-rate wireless mesh network, and the destination IPv6 address is an address of a node in the low-rate wireless mesh network, compressing, by the network node, the source IPv6 address and the destination IPv6 address of the IPv6 packet, and causing the source address compression flag to indicate that the source IPv6 address is compressed, and the destination address compression flag to indicate that the destination IPv6 address is compressed; when the source IPv6 address is an address of a node in the low-rate wireless mesh network, but the destination IPv6 address is not an address of a node in the low-rate wireless mesh network, compressing, by the network node, the source IPv6 address of the IPv6 packet, and causing the source address compression flag to indicate that the source IPv6 address is compressed, and the destination address compression flag to indicate that the destination IPv6 address is not compressed, where the 6LoWPAN compressed IPv6 packet further includes an inner IPv6 field, and the inner IPv6 field includes the destination IPv6 address; or when the source IPv6 address is not an address of a node in the low-rate wireless mesh network, but the destination IPv6 address is an address of a node in the low-rate wireless mesh network, compressing, by the network node, the destination IPv6 address of the IPv6 packet, and causing the source address compression flag to indicate that the source IPv6 address is not compressed, and the destination address compression flag to indicate that the destination IPv6 address is compressed, where the 6LoWPAN compressed IPv6 packet further includes an inner IPv6 field, and the inner IPv6 field includes the source IPv6 address.

Because the layer-2 forwarding header is encapsulated in the outer layer of the 6LoWPAN compressed IPv6 packet, and the node can obtain the layer-2 forwarding header directly, the node can obtain the final MAC address more easily and quickly to perform layer-2 forwarding. This improves forwarding efficiency. In addition, because the layer-2 forwarding header includes the original MAC address obtained based on the source IPv6 address and the final MAC address obtained based on the destination IPv6 address, after the IPv6 packet is compressed according to a compression mechanism defined in the 6LoWPAN protocol, the inner IPv6 field may be compressed to 0 bytes (that is, the 6LoWPAN compressed IPv6 packet may not include the inner IPv6 field). Therefore, a better compression effect is achieved, and compression efficiency is improved.

With reference to any one of the first aspect and the foregoing possible implementations of the first aspect, in a fourth possible implementation of the first aspect, the obtaining, by the network node, a MAC address of a next-hop node based on the final MAC address includes: querying, by the network node, a layer-2 forwarding table of the network node based on the final MAC address, to obtain the MAC address of the next-hop node, where the layer-2 forwarding table includes a correspondence between the final MAC address and the MAC address of the next-hop node. Specifically, the layer-2 forwarding table includes one or more forwarding entries, where each forwarding entry includes the correspondence between the final MAC address and the MAC address of the next-hop node.

Optionally, before the network node queries the layer-2 forwarding table of the network node based on the final MAC address, the network node translates a layer-3 routing table of the network node into the layer-2 forwarding table based on a correspondence between an IP address and a MAC address of each node in the low-rate wireless mesh network. After the translation, the network node has both the layer-3 routing table and the layer-2 forwarding table. The network node may store the correspondence between the IP address and the MAC address of each node by using a correspondence table.

The network node enabling a layer-2 forwarding function in the low-rate wireless mesh network needs to translate the layer-3 routing table into the layer-2 forwarding table for performing layer-2 forwarding based on the MAC address. Therefore, when receiving the data frame including the layer-2 forwarding header, the network node can query the layer-2 forwarding table based on the final MAC address in the layer-2 forwarding header to obtain the MAC address of the next-hop node and complete layer-2 forwarding.

With reference to any one of the first aspect and the foregoing possible implementations of the first aspect, in a fifth possible implementation of the first aspect, before the network node obtains the final MAC address based on the destination IPv6 address, the network node obtains the correspondence between the IP address and the MAC address. The network node may obtain the correspondence between the IP address and the MAC address in any one of the following manners:

In a manner 2, the Neighbor Discovery Protocol is extended, and the network node and other nodes in the low-rate wireless mesh network mutually synchronize a neighbor cache table to obtain correspondences between IPv6 addresses and MAC addresses of all nodes in the low-rate wireless mesh network.

In a manner 1, a layer-3 routing protocol is extended, and each node in the low-rate wireless mesh network advertises its MAC address in a process of establishing a route, that is, when each node in the low-rate wireless mesh network establishes a route, the packet includes not only the IP address of the node but also the MAC address of the node.

In a manner 3, for a low-rate wireless mesh network in which an IPv6 address is generated in a stateless address auto-configuration (SLAAC) manner, because an IPv6 address and a MAC address may be mutually translated, the corresponding MAC address can be obtained directly based on the IPv6 address, and therefore, a correspondence between the IP address and the MAC address is obtained.

In any one of the foregoing manners, the network node can obtain the correspondence between the IP address and the MAC address, and therefore can complete translation from the source IPv6 address and the destination IPv6 address of the IPv6 packet to the original MAC address and the final MAC address, and can further complete translation from the layer-3 routing table to the layer-2 forwarding table.

With reference to the fifth possible implementation of the first aspect, in a sixth possible implementation of the first aspect, the manner 1 includes: receiving, by the network node, a first destination advertisement object (DAO) packet or a first destination oriented directed acyclic graph information object (DIO) packet sent by the final node, and obtaining a correspondence between an IPv6 address of the final node and the MAC address of the final node from the first DAO packet or the first DIO packet; and receiving, by the network node, a second DAO packet or a second DIO packet sent by the next-hop node, and obtaining a correspondence between an IPv6 address and the MAC address of the next-hop node from the second DAO packet or the second DIO packet.

The network node may further send a third DAO packet or a third DIO packet, where the third DAO packet or the third DIO packet includes an IPv6 address and the MAC address of the network node, so that a node receiving the third DAO packet or the third DIO packet obtains a correspondence between the IPv6 address of the network node and the MAC address of the network node.

Therefore, when each node in the low-rate wireless mesh network establishes a route (joining the network or changing a parent node thereof), the node sends a DAO packet or a DIO packet carrying a MAC address, so that other nodes receiving the DAO packet or the DIO packet can all obtain the correspondence between the IPv6 address and the MAC address of the node. In this way, the correspondences between the IPv6 addresses and the MAC addresses of all the nodes in the low-rate wireless mesh network are obtained.

According to a second aspect, a packet forwarding method is provided and applied to a low-rate wireless mesh network, where the method includes: receiving, by a network node, a data frame, where the data frame includes a MAC header and a layer-2 forwarding header, the MAC header includes a source MAC address and a destination MAC address, the layer-2 forwarding header includes an original MAC address and a final MAC address, the data frame further includes a 6LoWPAN compressed IPv6 packet, and the MAC header and the layer-2 forwarding header are located in an outer layer of the 6LoWPAN compressed IPv6 packet (even a 6LoWPAN compressed IPv6 packet after data link layer encryption is performed according to IEEE 802.15.4); enabling, by the network node, a layer-2 forwarding function; when the final MAC address is not a MAC address of the network node (the network node may determine, by comparing the final MAC address with the MAC address of the network node, whether the final MAC address is the MAC address of the network node), obtaining, by the network node, a MAC address of a next-hop node based on the final MAC address; updating, by the network node, the source MAC address to the MAC address of the network node, and updating the destination MAC address to the MAC address of the next-hop node; and sending the data frame to the next-hop node.

In a process of transmitting the data frame in the low-rate wireless mesh network, when receiving the data frame carrying the layer-2 forwarding header, an intermediate forwarding node (a non-final node) can directly perform layer-2 forwarding based on the layer-2 forwarding header, and there is no need to perform decompression (or decryption and decompression) on the data frame to obtain a destination IPv6 address of an IPv6 packet and perform layer-3 routing and then perform compression (or compression and encryption) processing to obtain the data frame. This improves forwarding efficiency, and further avoids consumption of resources and power caused by decompression (or decryption and decompression) and then compression (or compression and encryption) processing.

In a first possible implementation of the second aspect, the method further includes: when the final MAC address is the MAC address of the network node, that is, the network node determines that the network node is a final node for the data frame, decapsulating, by the network node, the data frame to obtain an IPv6 packet.

Specifically, the decapsulating, by the network node, the data frame to obtain an IPv6 packet includes: removing, by the network node, link layer encapsulation (removing the MAC header and the layer-2 forwarding header, and optionally performing data link layer decryption processing) of the data frame to obtain the 6LoWPAN compressed IPv6 packet, where the 6LoWPAN compressed IPv6 packet includes a 6LoWPAN compressed header, the 6LoWPAN compressed header includes a source address compression flag and a destination address compression flag, the source address compression flag is used to indicate whether a source IPv6 address is compressed, and the destination address compression flag is used to indicate whether a destination IPv6 address is compressed; and decompressing, by the network node, the 6LoWPAN compressed IPv6 packet based on the layer-2 forwarding header and the 6LoWPAN compressed header to obtain the IPv6 packet.

The decompressing, by the network node, the 6LoWPAN compressed IPv6 packet based on the layer-2 forwarding header and the 6LoWPAN compressed header includes: when the source address compression flag indicates that the source IPv6 address is compressed, and the destination address compression flag indicates that the destination IPv6 address is compressed, obtaining, by the network node, the source IPv6 address of the IPv6 packet based on the original MAC address in the layer-2 mesh header, and obtaining the destination IPv6 address of the IPv6 packet based on the final MAC address in the layer-2 mesh header; when the source address compression flag indicates that the source IPv6 address is compressed, and the destination address compression flag indicates that the destination IPv6 address is not compressed, obtaining, by the network node, the source IPv6 address of the IPv6 packet based on the original MAC address in the layer-2 mesh header, and obtaining the destination IPv6 address of the IPv6 packet from an inner IPv6 field in the 6LoWPAN compressed IPv6 packet; or when the source address compression flag indicates that the source IPv6 address is not compressed, and the destination address compression flag indicates that the destination IPv6 address is compressed, obtaining, by the network node, the destination IPv6 address of the IPv6 packet based on the final MAC address in the layer-2 mesh header, and obtaining the source IPv6 address of the IPv6 packet from an inner IPv6 field in the 6LoWPAN compressed IPv6 packet.

Therefore, based on the layer-2 forwarding header, the intermediate node performs layer-2 forwarding on the data frame carrying the layer-2 forwarding header in the low-rate wireless mesh network, without performing decompression (or decryption and decompression) and then compression (or compression and encryption) processing, and only the final node performs decompression (or decryption and decompression) processing on the data frame. This not only saves power, but also improves network performance (of packet forwarding and processing).

With reference to the second aspect or the first possible implementation of the second aspect, in a second possible implementation of the second aspect, the obtaining, by the network node, a MAC address of a next-hop node based on the final MAC address includes: querying, by the network node, a layer-2 forwarding table of the network node based on the final MAC address, to obtain the MAC address of the next-hop node, where the layer-2 forwarding table includes a correspondence between the final MAC address and the MAC address of the next-hop node. Specifically, the layer-2 forwarding table includes one or more forwarding entries, where each forwarding entry includes the correspondence between the final MAC address and the MAC address of the next-hop node.

Optionally, before the network node queries the layer-2 forwarding table of the network node based on the final MAC address, the network node translates a layer-3 routing table of the network node into the layer-2 forwarding table based on a correspondence between an IP address and a MAC address of each node in the low-rate wireless mesh network. After the translation, the network node has both the layer-3 routing table and the layer-2 forwarding table. The network node may store the correspondence between the IP address and the MAC address of each node by using a correspondence table.

Therefore, the network node enabling the layer-2 forwarding function in the low-rate wireless mesh network needs to translate the layer-3 routing table into the layer-2 forwarding table for performing layer-2 forwarding based on the MAC address, and when receiving the data frame including the layer-2 forwarding header, query the layer-2 forwarding table based on the final MAC address in the layer-2 forwarding header to obtain the MAC address of the next-hop node and perform layer-2 forwarding. This can not only improve forwarding efficiency but also save processing resources and power.

With reference to any one of the second aspect and the foregoing possible implementations of the second aspect, in a third possible implementation of the second aspect, the method further includes: obtaining, by the network node, the correspondence between the IP address and the MAC address of each node in the low-rate wireless mesh network.

The network node may obtain the correspondence between the IP address and the MAC address of each node in the low-rate wireless mesh network in any one of the following manners:

In a manner 1, a layer-3 routing protocol is extended, and each node in the low-rate wireless mesh network advertises its MAC address in a process of establishing a route, that is, when each node in the low-rate wireless mesh network establishes a route, the packet includes not only the IP address of the node but also the MAC address of the node.

In a manner 2, the Neighbor Discovery Protocol is extended, and the network node and other nodes in the low-rate wireless mesh network mutually synchronize a neighbor cache table to obtain correspondences between IPv6 addresses and MAC addresses of all nodes in the low-rate wireless mesh network.

With reference to the third possible implementation of the second aspect, in a fourth possible implementation of the second aspect, the manner 1 includes: sending, by the network node, a first DAO packet or a first DIO packet, where the first DAO packet or the first DIO packet includes an IPv6 address and the MAC address of the network node, so that a node receiving the first DAO packet or the first DIO packet obtains a correspondence between the IPv6 address of the network node and the MAC address of the network node; and receiving, by the network node, a second DAO packet or a second DIO packet sent by the next-hop node, and obtaining a correspondence between an IPv6 address of the next-hop node and the MAC address of the next-hop node from the second DAO packet or the second DIO packet.

After enabling the layer-2 forwarding function, each node in the low-rate wireless mesh network needs to obtain the correspondences between the IPv6 addresses and the MAC addresses of all the nodes in the network, to translate the layer-3 routing table into the layer-2 forwarding table to perform layer-2 forwarding.

According to a third aspect, a network node is provided and configured to implement the foregoing packet forwarding method. The network node includes a processor and a communications interface. The processor is configured to support the network node to perform a corresponding function in the foregoing method. The communications interface is configured to support communication between network nodes, and send and receive the data frame in the foregoing method and related information and signaling. The network node further includes a memory. The memory is coupled with the processor and stores data (for example, a layer-2 forwarding table, a layer-3 routing table, a correspondence between an IPv6 address and a MAC address) used by the network node. The memory may be further configured to store an instruction. The processor executes the instruction stored in the memory, and implements the packet forwarding methods in the first aspect and the second aspect.

According to a fourth aspect, a packet forwarding apparatus is provided and applied to a network node in a low-rate wireless mesh network, where the packet forwarding apparatus includes modules for implementing the packet forwarding methods in the first aspect and the second aspect.

According to a fifth aspect, a computer storage medium is provided and stores program code for implementing the packet forwarding methods in the first aspect and the second aspect, where the program code includes an instruction. A network node or a packet forwarding apparatus may execute the program code to implement the packet forwarding methods in the first aspect and the second aspect.

According to a sixth aspect, a low-rate wireless mesh network (packet forwarding system) is provided and includes a plurality of network nodes. Each network node may be the network node in the third aspect or include the packet forwarding apparatus in the fourth aspect.

In the technical solution provided in this application, a layer-2 forwarding header is added to a data frame, and layer-2 forwarding is performed based on a final MAC address in the layer-2 forwarding header. This avoids decompression (or decryption and decompression) hop by hop and then compression (or compression and encryption) processing in a packet forwarding process, and not only improves packet forwarding efficiency, but also saves power (energy saving).

DESCRIPTION OF EMBODIMENTS

An embodiment of the present disclosure provides a packet forwarding method. For a low-rate wireless mesh network constructed according to the IEEE 802.15.4 protocol and the 6LoWPAN protocol, a layer-3 routing table generated according to a layer-3 routing protocol, for example, the IPv6 routing protocol for low-power and lossy network (RPL), may be translated into a link layer forwarding table based on a correspondence between an IPv6 address and a MAC address. The link layer forwarding table is also referred to as a layer-2 forwarding table. In addition, a data frame in the low-rate wireless mesh network is extended, and a layer-2 forwarding header is added after a MAC header of a packet to cooperate with the link layer forwarding table in implementing layer-2 forwarding of the packet.

In this embodiment of the present disclosure, layer 3 is a network layer defined in an Open Systems Interconnection (OSI) reference model, and layer 2" is a data link layer defined in OSI.

Figure 1:
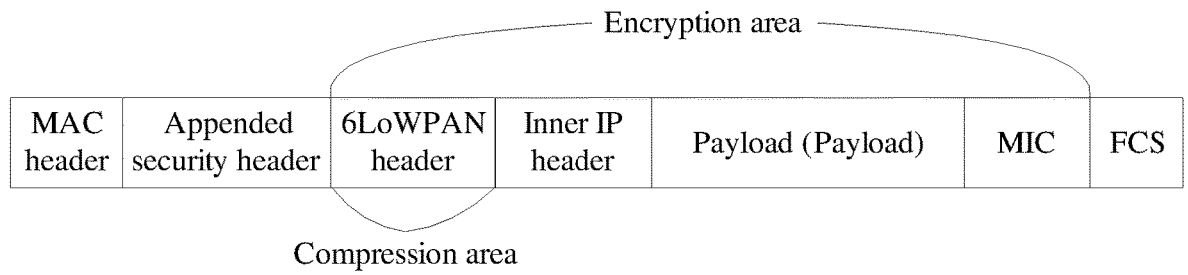
FIG. 1 is a schematic diagram of a format of a data frame in an existing low-rate wireless mesh network.
Figure 2:
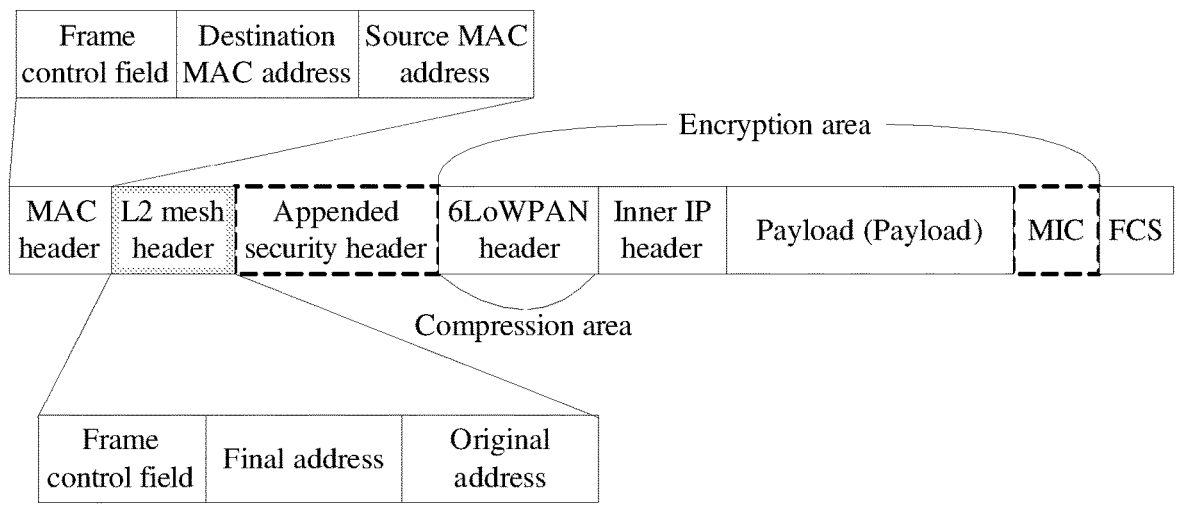
FIG. 2 is a schematic diagram of a format of a data frame including a layer-2 forwarding header according to an embodiment of the present disclosure.

As shown in FIG. 2, FIG. 2 is a schematic diagram of a format of an extended packet including a layer-2 forwarding header according to an embodiment of the present disclosure. The layer-2 forwarding header includes a frame control field, an original MAC (initial MAC (iMAC)) address and a final MAC (fMAC) address.

The frame control field includes a protocol version number, an original MAC address mode, a final MAC address mode, and a remaining hop count. The original MAC address mode and the final MAC address mode are used to indicate modes of a MAC address, 0 indicates that the address is 8 bytes, and 1 indicates that the address is 2 bytes. The remaining hop count (hop left) is decreased by 1 every time forwarding is performed and is used to prevent cyclic forwarding of a packet in a network. An original node may set the remaining hop count based on a scale of a low-rate wireless mesh network, for example, a maximum of 32 hops. The original node may alternatively set the remaining hop count to a hop count in an IPv6 packet header. If a node receives a data frame whose remaining hop count is 0, the node should discard the data frame.

Figure 3:
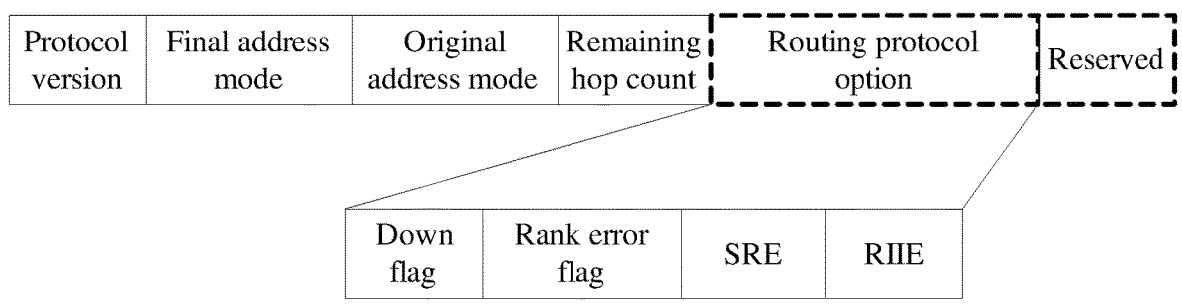
FIG. 3 is a schematic diagram of a format of a frame control field in a layer-2 forwarding header according to an embodiment of this application.

The frame control field may further include a routing protocol option used to carry control information for layer-3 routing and forwarding in the packet. For example, as shown in FIG. 3, FIG. 3 is a schematic diagram of a format of a frame control field in a layer-2 forwarding header according to an embodiment of the present disclosure. For example, an RPL routing protocol option is included. Certainly, in an actual application, the frame control field may alternatively not include a routing protocol option.

In the RPL routing protocol option shown in FIG. 3:

A down flag is used to indicate whether a packet is sent downward by a root node, and is usually used for a loop detection function in the RPL protocol. When the packet is sent downward by the root node (that is, a border router (BR)), the down flag is set to 1, or else set to 0.

A rank error flag is used when the down flag is 1 (that is, the packet is sent downward by the root node). If a sender rank is greater than a local node rank, the rank error flag is 1, indicating that a loop exists. Otherwise, the rank error flag is 0.

A sender rank existence (SRE) flag is used to indicate whether a sender rank field exists after the layer-2 forwarding header. For example, if the flag is 1, it indicates that a sender rank field (2 bytes) exists after the layer-2 forwarding header. If the rank error flag is 0, no sender rank field exists. The sender rank field is used for RPL loop detection.

An RPL instance existence (RIIE) flag is used to indicate whether an RPL instance identifier (ID) field exists after the layer-2 forwarding header. For example, if the flag is 1, it indicates that an RPL instance ID (1 byte) exists after the layer-2 forwarding header. If the flag is 0, it indicates that no RPL instance ID field exists. The RPL instance ID is used to distinguish between different instances in an RPL network.

A reserved field may be null, or may include a sender rank field when the SRE flag is 1, and include an RPL instance ID when the RIIE flag is 1.

RPL is an IPv6 routing protocol based on a distance vector, and supports mesh network construction and implements routing and forwarding of an IPv6 packet. A mesh network constructed based on RPL is a layer-3 mesh network, and its network topology is a directed acyclic graph, also referred to as a destination oriented directed acyclic graph (DODAG). Considering low power consumption and lossy features of the low-rate wireless mesh network, RPL is a common routing protocol in the low-rate wireless mesh network.

In this embodiment of the present disclosure, for example, RPL is used as a layer-3 routing protocol to describe the packet forwarding method of the present disclosure. Certainly, the method may also be implemented by using other routing protocols, for example, the wireless ad-hoc on-demand distance vector (AODV) routing protocol, and the Routing Information Protocol Next Generation (RIPng). This is not limited in the present disclosure.

In this embodiment of the present disclosure, an original MAC address (initial address) is obtained based on a source IPv6 address of a packet, and is a MAC address of an original node in the low-rate wireless mesh network. A final MAC address (final address) is obtained based on a destination IPv6 address of the packet, and is a MAC address of a final node for which the packet is destined in the low-rate wireless mesh network.

Figure 4:
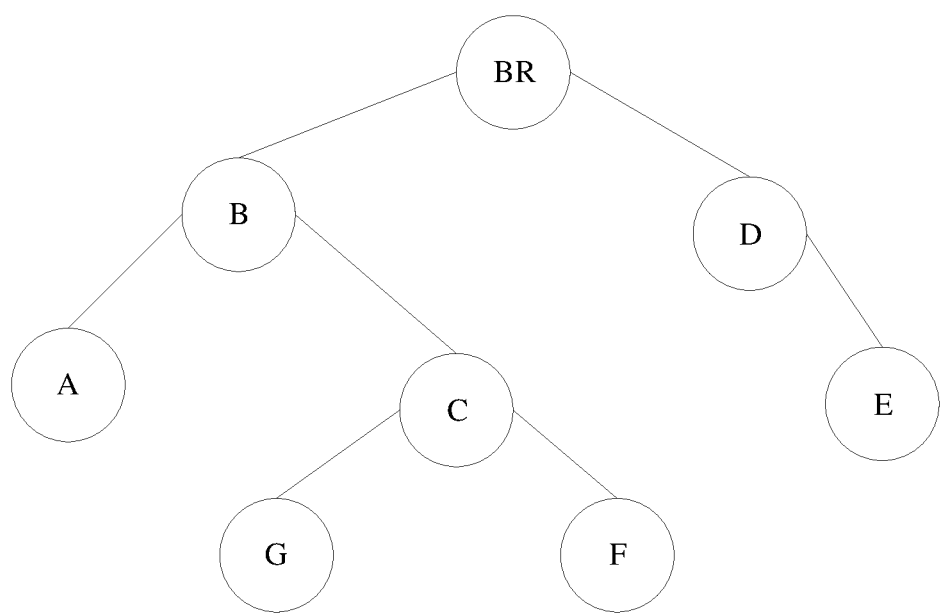
FIG. 4 is a schematic structural diagram of a low-rate wireless mesh network according to an embodiment of this application.

Referring to FIG. 4, FIG. 4 is a schematic structural diagram of a low-rate wireless mesh network according to an embodiment of the present disclosure. The low-rate wireless mesh network includes several nodes, where a border router (BR) is configured to connect the low-rate wireless mesh network to another network or a user terminal.

When an IPv6 packet is sent from one node to another node in the low-rate wireless mesh network, for example, sent from a node A to a node F in FIG. 4, a source IPv6 address is an IPv6 address of the node A, and a destination IPv6 address is an IPv6 address of the node F. Correspondingly, an original MAC address in a layer-2 forwarding header is a MAC address of the node A, and a final MAC address is a MAC address of the node F. In addition, according to a compression mechanism defined in the 6LoWPAN protocol, an inner IPv6 field is 0 bytes, that is, there is no inner IPv6 field, and a 6LoWPAN compressed header indicates that the source address is compressed and that the destination address is compressed.

When the IPv6 packet is sent by a node outside the low-rate wireless mesh network, for example, a node X (not shown in FIG. 4), to a node in the low-rate wireless mesh network, for example, the node F in FIG. 4, the source IPv6 address is an IPv6 address of the node X, and the destination IPv6 address is the IPv6 address of the node F. In this case, an original node for the IPv6 packet in the low-rate wireless mesh network is the BR in the low-rate wireless mesh network. Correspondingly, the original MAC address in the layer-2 forwarding header is a MAC address of the BR, and the final MAC address is the MAC address of the node F. In addition, according to the compression mechanism defined in the 6LoWPAN, the inner IPv6 field includes the source IPv6 address, that is, the IPv6 address of the node X, and the 6LoWPAN compressed header indicates that the source address is not compressed and that the destination address is compressed.

When the IPv6 packet is sent by a node in the low-rate wireless mesh network, for example, the node A, to a node outside the low-rate wireless mesh network, for example, the node X (not shown in FIG. 4), the source IPv6 address is the IPv6 address of the node A, and the destination IPv6 address is the IPv6 address of the node X. In this case, a final node for the IPv6 packet in the low-rate wireless mesh network is the BR in the low-rate wireless mesh network. Correspondingly, the original MAC address in the layer-2 forwarding header is the MAC address of the node A, and the final MAC address is the MAC address of the BR. In addition, according to the compression mechanism defined in the 6LoWPAN, the inner IPv6 field includes the destination IPv6 address, that is, the IPv6 address of the node X, and the 6LoWPAN compressed header indicates that the source address is compressed and that the destination address is not compressed.

Further, a layer-2 forwarding header identifier may be extended in a MAC header, to indicate whether a data frame includes a layer-2 forwarding header. Specifically, a bit reserved in a frame control field of the MAC header, for example, a bit 7, may be used as the layer-2 forwarding header identifier. For example, if the bit 7 is set to 1, it indicates that a packet includes a layer-2 forwarding header; or if the bit 7 is set to 0, it indicates that a packet does not include a layer-2 forwarding header. When receiving a data frame without a layer-2 forwarding header, a node may still perform processing in a conventional manner. Certainly, another field in the MAC header may be extended as the layer-2 forwarding header identifier, and this is not limited in the present disclosure.

By using the packet forwarding method provided in this embodiment of the present disclosure, each node in the low-rate wireless mesh network maps a layer-3 routing table to a layer-2 forwarding table. The original node performs compression and encryption (optional) processing on the IPv6 packet, and then encapsulates the layer-2 forwarding header and the MAC header to obtain a data frame. The original MAC address and the final MAC address in the layer-2 forwarding header remain unchanged in a forwarding process, and an intermediate node only needs to perform layer-2 forwarding based on the layer-2 forwarding header. Only the final node performs decryption (optional) and decompression processing to obtain the IPv6 packet, and then parses the IPv6 packet. Therefore, in the low-rate wireless mesh network, only the original node performs compression and encryption (optional) processing once on the IPv6 packet, the final node performs decryption (optional) and decompression processing once, and the intermediate node only needs to perform layer-2 forwarding based on the layer-2 forwarding header. This avoids encryption/decryption (optional) and compression/decompression hop by hop in the packet forwarding process, and therefore improves forwarding efficiency.

Optionally, a node in the low-rate wireless mesh network may enable or disable layer-2 forwarding. When the node enables layer-2 forwarding, the node may map the layer-3 routing table to a layer-2 forwarding table, and performs layer-2 forwarding on the packet based on the layer-2 forwarding header. When the node does not enable layer-2 forwarding, the node may still process the packet in the conventional manner.

In this embodiment of the present disclosure, the layer-3 routing table needs to be translated into a link layer forwarding table (layer-2 forwarding table) based on a correspondence between the IPv6 address and the MAC address.

In a possible implementation, the IPv6 address is generated in a stateless address auto-configuration (SLAAC) manner. Therefore, the IPv6 address and the MAC address may be mutually translated.

The IPv6 address generated in the SLAAC manner includes a 64-bit network prefix and a 64-bit interface identifier. The interface identifier is generated based on a 64-bit MAC address, also referred to as a 64-bit extended unique identifier (EUI-64). Specifically, 64 bits obtained after universal/local (U/L) bits are negated in the EUI-64 are used as last 64 bits of the IPv6 address, and the network prefix is used as first 64 bits, so that the 128-bit IPv6 address is obtained.

Therefore, conversely, the MAC address may also be obtained based on the IPv6 address, and further, the L3 routing table may be mapped to an L2 forwarding table. Specifically, after the front 64-bit network prefix of the IPv6 address is removed, the 64-bit interface identifier is obtained, and after the U/L bits are negated, the MAC address can be obtained.

In another possible implementation, each node in the low-rate wireless mesh network may translate the layer-3 routing table based on the correspondence between the IPv6 address and the MAC address to obtain a link layer forwarding table.

The Neighbor Discovery Protocol may be extended, so that each node in the low-rate wireless mesh network mutually synchronizes a neighbor cache table to obtain a correspondence between an IPv6 address and a MAC address of each node in the network.

Alternatively, a layer-3 routing protocol may be extended, and the MAC address is advertised in a route establishing process. For example, in the RPL protocol, a field may be extended in a destination advertisement object (DAO) packet or a DIO packet, and is used to carry the MAC address (because the DAO packet or the DIO packet originally includes the IPv6 address of the node), and certainly may also carry the correspondence between the IPv6 address and the MAC address. For example, when the node joins the network or changes a parent node of the node, the node sends a DAO packet or a DIO packet carrying the MAC address, so that other nodes receiving the DAO packet or the DIO packet can all obtain the correspondence between the IPv6 address and the MAC address of the node. For another example, in the AODV routing protocol, a route reply packet may be extended to carry a MAC address. In RIPng, a MAC address is carried in a flooding process.

The technical solution provided in this embodiment of the present disclosure is applicable to a low-rate wireless mesh network in which an IPv6 packet needs to be compressed and/or encrypted for transmission.

The data frame in this embodiment of the present disclosure is a data frame defined in the IEEE 802.15.4 standard.

The following describes a packet forwarding method and apparatus in a low-rate wireless mesh network according to the embodiments of the present disclosure with reference to accompanying drawings. In the description of the following embodiments, it is assumed that an IPv6 packet needs to be compressed and encrypted for transmission. However, the present disclosure is not limited thereto.

Figure 5:
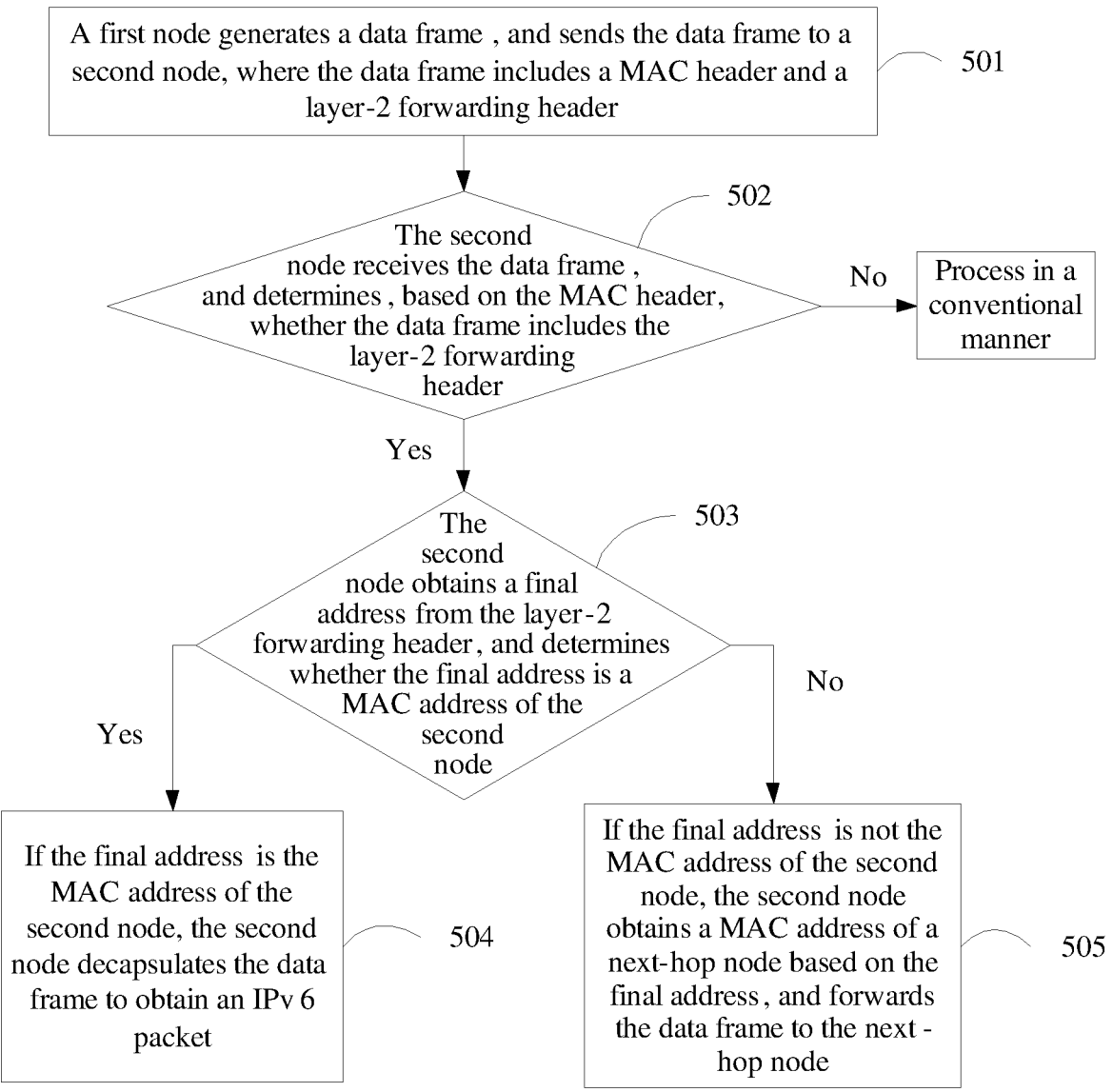
FIG. 5 is a schematic flowchart of a packet forwarding method according to an embodiment of this application.

Referring to FIG. 5, FIG. 5 is a schematic interaction flowchart of a packet forwarding method according to an embodiment of the present disclosure, where the method is applied to a low-rate wireless mesh network. The method includes the following steps.

501. A first node (an original node) generates a data frame based on an IPv6 packet, and sends the data frame to a second node, where the data frame includes a MAC header and a layer-2 forwarding header.

The layer-2 forwarding header includes an original MAC address and a final MAC address. The original MAC address is a MAC address of the first node. The final MAC address is a MAC address of a final node.

The layer-2 forwarding header may further include a remaining hop count. The first node may set the remaining hop count based on a scale of the low-rate wireless mesh network. The first node may also set the remaining hop count to a hop count in a header of the IPv6 packet.

Optionally, the layer-2 forwarding header further includes a routing protocol option, where the routing protocol option includes information about hop-by-hop forwarding in an extended header of the IPv6 packet, as shown in FIG. 3.

The MAC header includes a source MAC (SMAC) address and a destination MAC (DMAC) address. The source MAC address is the MAC address of the first node, and the destination MAC address is a MAC address of the second node. The second node is a next hop of the first node.

The MAC header further includes a layer-2 forwarding header identifier, used to indicate whether the data frame includes the layer-2 forwarding header. Therefore, after receiving the data frame, a node in the low-rate wireless mesh network can correctly obtain the layer-2 forwarding header based on the identifier, and perform layer-2 forwarding on the data frame based on the layer-2 forwarding header.

The data frame further includes a 6LoWPAN compressed IPv6 packet, and the MAC header and the layer-2 forwarding header are located in an outer layer of the 6LoWPAN compressed IPv6 packet (even a 6LoWPAN compressed IPv6 packet after data link layer encryption is performed according to IEEE 802.15.4).

The first node enables a layer-2 forwarding function.

Before the first node (original node) generates the data frame based on the IPv6 packet, the first node obtains the original MAC address and the final MAC address based on a source IPv6 address and a destination IPv6 address of the IPv6 packet, and obtains the MAC address of the next-hop node (that is, the second node) based on the final MAC address.

That the first node obtains the MAC address of the next-hop node based on the final MAC address includes: the first node queries a layer-2 forwarding table of the first node based on the final MAC address, to obtain the MAC address of the next-hop node (that is, the second node), where the layer-2 forwarding table includes a correspondence between the final MAC address and the MAC address of the second node. Specifically, the layer-2 forwarding table includes one or more forwarding entries, where each forwarding entry includes the correspondence between the final MAC address and the MAC address of the second node.

Optionally, before the first node queries the layer-2 forwarding table based on the final MAC address, the first node translates a layer-3 routing table of the first node into the layer-2 forwarding table based on a correspondence between an IP address and a MAC address of each node in the low-rate wireless mesh network. After the translation, the first node may have both the layer-3 routing table and the layer-2 forwarding table. The first node may store the correspondence between the IP address and the MAC address of each node in the low-rate wireless mesh network by using a correspondence table.

That the first node obtains the correspondence between the IP address and the MAC address of each node in the low-rate wireless mesh network may include: the first node receives a first DAO packet or a first DIO packet sent by the final node, and obtains a correspondence between an IPv6 address of the final node and the MAC address of the final node from the first DAO packet or the first DIO packet; and the first node receives a second DAO packet or a second DIO packet sent by the second node, and obtains a correspondence between an IPv6 address and the MAC address of the next-hop node from the second DAO packet or the second DIO packet.

The first node may further send a third DAO packet or a third DIO packet, where the third DAO packet or the third DIO packet includes an IPv6 address and the MAC address of the first node, so that a node receiving the third DAO packet or the third DIO packet obtains a correspondence between the IPv6 address of the first node and the MAC address of the first node.

That the first node generates a data frame based on an IPv6 packet, that is, the first node performs encapsulation processing on the IPv6 packet to generate the data frame includes: the first node compresses the IPv6 packet (specifically a packet header of the IPv6 packet) by using a compression mechanism specified in the 6LoWPAN protocol, and encapsulates a 6LoWPAN compressed header to obtain the 6LoWPAN compressed IPv6 packet, where the 6LoWPAN compressed header includes a source address compression flag and a destination address compression flag, the source address compression flag is used to indicate whether the source IPv6 address is compressed, and the destination address compression flag is used to indicate whether the destination IPv6 address is compressed; and then the first node encapsulates the layer-2 forwarding header and the MAC header in the outer layer of the 6LoWPAN compressed IPv6 packet to obtain the data frame.

That the first node encapsulates the IPv6 packet by using a compression mechanism specified in the 6LoWPAN protocol includes: when the source IPv6 address is an address of a node in the low-rate wireless mesh network, and the destination IPv6 address is an address of a node in the low-rate wireless mesh network, the first node compresses the source IPv6 address and the destination IPv6 address of the IPv6 packet, and causes the source address compression flag to indicate that the source IPv6 address is compressed, and the destination address compression flag to indicate that the destination IPv6 address is compressed, where the 6LoWPAN compressed IPv6 packet includes no inner IPv6 field, that is, the inner IPv6 field is 0 bytes; when the source IPv6 address is an address of a node in the low-rate wireless mesh network, but the destination IPv6 address is not an address of a node in the low-rate wireless mesh network, the first node compresses the source IPv6 address of the IPv6 packet, and causes the source address compression flag to indicate that the source IPv6 address is compressed, and the destination address compression flag to indicate that the destination IPv6 address is not compressed, where the 6LoWPAN compressed IPv6 packet further includes an inner IPv6 field, and the inner IPv6 field includes the destination IPv6 address; or when the source IPv6 address is not an address of a node in the low-rate wireless mesh network, but the destination IPv6 address is an address of a node in the low-rate wireless mesh network, the first node compresses the destination IPv6 address of the IPv6 packet, and causes the source address compression flag to indicate that the source IPv6 address is not compressed, and the destination address compression flag to indicate that the destination IPv6 address is compressed, where the 6LoWPAN compressed IPv6 packet further includes an inner IPv6 field, and the inner IPv6 field includes the source IPv6 address.

Optionally, if the packet needs to be encrypted for transmission, before the first node encapsulates the layer-2 forwarding header and the MAC header in the outer layer of the 6LoWPAN compressed IPv6 packet, the method further includes: the first node encrypts the 6LoWPAN compressed IPv6 packet according to a data link layer encryption mechanism provided by the IEEE 802.15.4 protocol, and adds an appended security header. Then, the first node sequentially encapsulates the layer-2 forwarding header and the MAC header in an outer layer of the appended security header to obtain the data frame of the structure shown in FIG. 2.

Because the layer-2 forwarding header is encapsulated in the outer layer of the IPv6 packet after encryption and compression processing, a node receiving the data frame can directly obtain the layer-2 forwarding header, and obtain the final MAC address more easily and quickly to perform layer-2 forwarding. This improves forwarding efficiency.

502. The second node receives the data frame, and determines, based on the MAC header of the data frame, whether the data frame includes the layer-2 forwarding header.

The second node enables the layer-2 forwarding function. After receiving the data frame, the second node first obtains the layer-2 forwarding header identifier in the MAC header of the data frame, and determines, based on the layer-2 forwarding header identifier, whether the data frame includes the layer-2 forwarding header. When the layer-2 forwarding header identifier indicates that the data frame includes the layer-2 forwarding header, step 503 is continued. When the layer-2 forwarding header identifier indicates that the data frame does not include the layer-2 forwarding header, the data frame is processed in a conventional manner, and the procedure is terminated.

503. The second node obtains a final MAC address from the layer-2 forwarding header of the data frame, and determines whether the final MAC address is a MAC address of the second node.

When the data frame includes the layer-2 forwarding header, the second node obtains the final MAC address from the layer-2 forwarding header of the data frame, and determines whether the final MAC address is the MAC address of the second node (the second node may determine, by comparing the final MAC address with the MAC address of the second node, whether the final MAC address is the MAC address of the second node). In other words, the second node needs to determine, based on the layer-2 forwarding header, whether the second node is the final node. When the final MAC address is the MAC address of the second node, that is, the second node is the final node for the data frame, the second node performs step 504; or when the final MAC address is not the MAC address of the second node, that is, the second node is not the final node for the data frame, the second node performs step 505.

Optionally, before the second node determines whether the final MAC address is the MAC address of the second node, the second node determines that the remaining hop count in the layer-2 forwarding header is not 0.

Optionally, if the layer-2 forwarding header further includes the routing protocol option, the second node checks the routing protocol option. For example, the second node checks parameters in the RPL routing protocol option shown in FIG. 3.

504. If the final MAC address is the MAC address of the second node, the second node decapsulates the data frame to obtain the IPv6 packet.

That the second node decapsulates the data frame to obtain the IPv6 packet includes: removing link layer encapsulation (removing the MAC header and the layer-2 forwarding header, and optionally performing data link layer decryption processing) of the data frame to obtain the 6LoWPAN compressed IPv6 packet, where the 6LoWPAN compressed IPv6 packet includes the 6LoWPAN compressed header, the 6LoWPAN compressed header includes the source address compression flag and the destination address compression flag, the source address compression flag is used to indicate whether the source IPv6 address is compressed, and the destination address compression flag is used to indicate whether the destination IPv6 address is compressed; and then the second node decompresses the 6LoWPAN compressed IPv6 packet based on the layer-2 forwarding header and the 6LoWPAN compressed header to obtain the IPv6 packet.

The removing link layer encapsulation of the data frame to obtain the 6LoWPAN compressed IPv6 packet includes: removing the MAC header and the layer-2 forwarding header, and performing data link layer decryption (according to the IEEE 802.15.4 protocol) based on the appended security header to obtain the 6LoWPAN compressed IPv6 packet.

That the second node decompresses the 6LoWPAN compressed IPv6 packet based on the layer-2 forwarding header and the 6LoWPAN compressed header includes: decompressing the compressed IPv6 packet by using a decompression mechanism specified in the 6LoWPAN protocol and based on the source address compression flag and the destination address compression flag in the 6LoWPAN compressed header, the layer-2 forwarding header (the original MAC address and/or the final MAC address), and the inner IPv6 field. Specifically, when the source address compression flag indicates that the source IPv6 address is compressed, and the destination address compression flag indicates that the destination IPv6 address is compressed, the second node obtains the source IPv6 address of the IPv6 packet based on the original MAC address in the layer-2 mesh header, and obtains the destination IPv6 address of the IPv6 packet based on the final MAC address in the layer-2 mesh header; when the source address compression flag indicates that the source IPv6 address is compressed, and the destination address compression flag indicates that the destination IPv6 address is not compressed, the second node obtains the source IPv6 address of the IPv6 packet based on the original MAC address in the layer-2 mesh header, and obtains the destination IPv6 address of the IPv6 packet from the inner IPv6 field in the 6LoWPAN compressed IPv6 packet; or when the source address compression flag indicates that the source IPv6 address is not compressed, and the destination address compression flag indicates that the destination IPv6 address is compressed, the second node obtains the destination IPv6 address of the IPv6 packet based on the final MAC address in the layer-2 mesh header, and obtains the source IPv6 address of the IPv6 packet from the inner IPv6 field in the 6LoWPAN compressed IPv6 packet.

After decapsulating the data frame and obtaining the IPv6 packet, the second node sends the IPv6 packet to an IPv6 protocol stack of the second node for parsing.

505. If the final MAC address is not the MAC address of the second node, the second node obtains a MAC address of a next-hop node based on the final MAC address, and forwards the data frame to the next-hop node.

Specifically, the second node queries a layer-2 forwarding table of the second node based on the final MAC address to obtain the MAC address of the next-hop node. Then, the second node updates the MAC header of the data frame. Specifically, the second node updates the source MAC address in the MAC header to the MAC address of the second node, and the destination MAC address to the MAC address of the next-hop node. Optionally, the second node further decreases the remaining hop count in the layer-2 forwarding header by 1. Then, the second nodes forwards the data frame to the next-hop node.

Optionally, before receiving the data frame, the second node obtains the correspondence between the IP address and the MAC address of each node in the low-rate wireless mesh network. Specifically, the method includes: the second node receives a fourth DAO packet or a fourth DIO packet sent by the next-hop node, and obtains a correspondence between an IPv6 address of the next-hop node and the MAC address of the next-hop node from the fourth DAO packet or the fourth DIO packet.

The second node may store the correspondence between the IP address and the MAC address of each node by using a correspondence table.

In the packet forwarding method provided in this embodiment of the present disclosure, the original node obtains the corresponding original MAC address and final MAC address based on the source IPv6 address and the destination IPv6 address of the IPv6 packet, and puts the original MAC address and the final MAC address in the layer-2 forwarding header that does not undergo compression (even encryption) processing in the outer layer of the IPv6 packet. After receiving the data frame, the intermediate node can obtain the final MAC address in the layer-2 forwarding header more easily and quickly to perform layer-2 forwarding, and there is no need to perform decompression (optional decryption) on the data frame to obtain the destination IPv6 address of the IPv6 packet and perform layer-3 routing. This improves forwarding efficiency. Decompression (and optional decryption) processing is performed on the data frame only after the data frame arrives at the final node. This avoids consumption of resources and power caused by decompression (or decryption and decompression) hop by hop and then compression (or compression and encryption) in the IPv6 packet forwarding process. Therefore, performance of the whole network can be improved.

Figure 6:
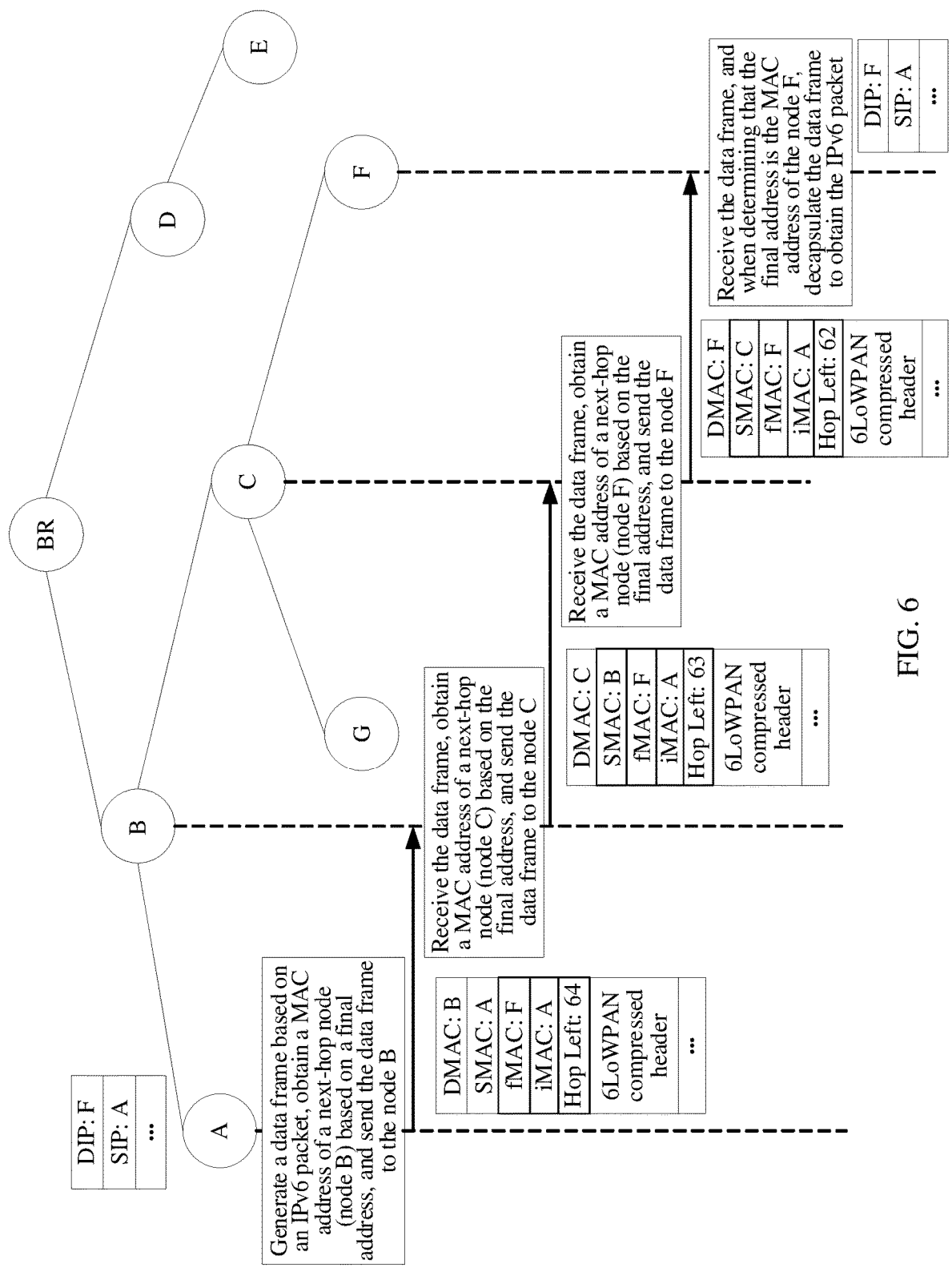
FIG. 6 is a schematic flowchart of another packet forwarding method according to an embodiment of this application.

The following describes a packet forwarding method provided in an embodiment of the present disclosure by using an example in which a node A in a low-rate wireless mesh network shown in FIG. 4 sends a packet to a node F. As shown in FIG. 6, the packet forwarding method includes the following steps.

601. A node A generates a data frame based on an IPv6 packet, where the data frame includes a 6LoWPAN compressed IPv6 packet, and a MAC header and a layer-2 forwarding header that are located in an outer layer of the 6LoWPAN compressed IPv6 packet, and the layer-2 forwarding header includes an original MAC address and a final MAC address; and the node A obtains, based on the final MAC address, a MAC address of a next-hop node, that is, a node B, and sends the data frame to the node B.

A source IPv6 address of the IPv6 packet is an IPv6 address of the node A, and a destination IPv6 address is an IPv6 address of a node F.

In the layer-2 forwarding header, the original MAC address is a MAC address of the node A, and the final MAC address is a MAC address of the node F.

The MAC header includes a source MAC address and a destination MAC address, where the source MAC address is the MAC address of the node A, and the destination MAC address is the MAC address of the node B. The MAC header further includes a layer-2 forwarding header identifier, and the layer-2 forwarding header identifier indicates that the data frame includes the layer-2 forwarding header.

The 6LoWPAN compressed IPv6 packet includes a 6LoWPAN compressed header, and the 6LoWPAN compressed header includes a source address compression flag and a destination address compression flag. The source address compression flag indicates that the source address is compressed, and the destination address compression flag indicates that the destination address is compressed.

The node A enables a layer-2 forwarding function, and can obtain a layer-2 forwarding table based on a layer-3 routing table, and can perform, based on the layer-2 forwarding table, layer-2 forwarding on the data frame including the layer-2 forwarding header.

Specifically, the node A obtains the original MAC address and the final MAC address in the layer-2 forwarding header respectively based on the source IPv6 address and the destination IPv6 address of the IPv6 packet and based on a correspondence between the IPv6 address and the MAC address. The node A then queries its layer-2 forwarding table based on the final MAC address to obtain the MAC address of the next-hop node, that is, the node B. Then, the node A compresses a header of the IPv6 packet according to a compression mechanism specified in the 6LoWPAN protocol, and encapsulates the 6LoWPAN compressed header to obtain the 6LoWPAN compressed IPv6 packet. In this embodiment, the layer-2 forwarding header includes the original MAC address and the final MAC address, the original MAC address corresponds to the source IPv6 address, and the final MAC address corresponds to the destination IPv6 address. Therefore, the node A can compress both the source IPv6 address and the destination IPv6 address of the IPv6 packet. This improves a compression effect. After the compression, in the 6LoWPAN compressed header, the source address compression flag indicates that the source address is compressed, and the destination address compression flag indicates that the destination address is compressed, and an inner IPv6 field is 0 bytes. Then, the node A performs encryption processing on the 6LoWPAN compressed IPv6 packet and encapsulates a security header, and then encapsulates the layer-2 forwarding header and the MAC header to obtain the data frame, as shown in FIG. 6.

The layer-2 forwarding header may further include a remaining hop count (hop left). As shown in FIG. 6, the remaining hop count (hop left) may be set to a maximum hop count supported by the low-rate wireless mesh network, for example, 64.

602. The node B receives the data frame, and when the final MAC address is not the MAC address of the node B, the node B obtains, based on the final MAC address, a MAC address of a next-hop node, that is, a node C, and sends the data frame to the node C.

Specifically, the node B obtains the final MAC address from the layer-2 forwarding header, and determines whether the final MAC address is its MAC address. When determining that the final MAC address is not its MAC address, the node B looks up its layer-2 forwarding table based on the final MAC address to obtain the MAC address of the next-hop node, that is, the node C. Then, the node B updates the MAC header of the data frame (updates the source MAC address to the MAC address of the node B, and the destination MAC address to the MAC address of the node C). Optionally, the node B decreases the remaining hop count in the layer-2 forwarding header by 1. Then, the node B sends the data frame to the node C.

Optionally, before obtaining the final MAC address from the layer-2 forwarding header, the node B determines, based on the layer-2 forwarding header identifier in the MAC header, that the data frame includes the layer-2 forwarding header.

603. The node C receives the data frame, and when the final MAC address is not the MAC address of the node C, the node C obtains, based on the final MAC address, a MAC address of a next-hop node, that is, a node F, and sends the data frame to the node F.

Specifically, the node C obtains the final MAC address from the layer-2 forwarding header, and determines whether the final MAC address is its MAC address. When determining that the final MAC address is not its MAC address, the node C looks up its layer-2 forwarding table based on the final MAC address to obtain the MAC address of the next-hop node, that is, the node F. Then, the node C updates the MAC header of the data frame (updates the source MAC address to the MAC address of the node C, and the destination MAC address to the MAC address of the node F). Optionally, the node C decreases the remaining hop count in the layer-2 forwarding header by 1. Then, the node C sends the data frame to the node F.

Optionally, before obtaining the final MAC address from the layer-2 forwarding header, the node C determines, based on the layer-2 forwarding header identifier in the MAC header, that the data frame includes the layer-2 forwarding header.

604. The node F receives the data frame, and when the final MAC address is the MAC address of the node F, the node F decapsulates the data frame to obtain the IPv6 packet.

Specifically, the node F obtains the final MAC address from the layer-2 forwarding header, and determines whether the final MAC address is its MAC address. When determining that the final MAC address is its MAC address, the node F decapsulates the data frame to obtain the IPv6 packet. Specifically, the node F removes the MAC header and the layer-2 forwarding header, performs decryption processing based on the security header to obtain the 6LoWPAN compressed IPv6 packet, and then decompresses the 6LoWPAN compressed IPv6 packet based on the 6LoWPAN compressed header (the source address compression flag and the destination address compression flag) and the original MAC address and the final MAC address in the layer-2 forwarding header to obtain the IPv6 packet.

Then, the node F parses the IPv6 packet sends the IPv6 packet to its IPv6 protocol stack for parsing.

Optionally, before obtaining the final MAC address from the layer-2 forwarding header, the node F determines, based on the layer-2 forwarding header identifier in the MAC header, that the data frame includes the layer-2 forwarding header.

Before step 601, the node enabling the layer-2 forwarding function in the low-rate wireless mesh network shown in FIG. 4 has obtained a correspondence between an IPv6 address and a MAC address of each node, and has translated the layer-3 routing table into the layer-2 forwarding table. For example, in a process of establishing a route by using the RPL protocol, each of the node A to the node F sends a DAO packet or a DIO packet including an IPv6 address and a MAC address to advertise a correspondence between the IPv6 address and the MAC address thereof.

In the packet forwarding method provided in this embodiment of the present disclosure, the original node A performs compression and encryption processing on the IPv6 packet, and then encapsulates the layer-2 forwarding header and the MAC header in the outer layer to obtain the data frame; after receiving the data frame, the intermediate nodes B and C directly obtain the final MAC address in the layer-2 forwarding header to perform layer-2 forwarding on the data frame; and only the final node F performs decryption and decompression processing on the data frame. This not only improves forwarding efficiency, but also avoids consumption of a large quantity of resources caused by decryption and decompression hop by hop and then compression and encryption processing in the IPv6 packet forwarding process. Therefore performance of the whole network is improved.

Figure 7:
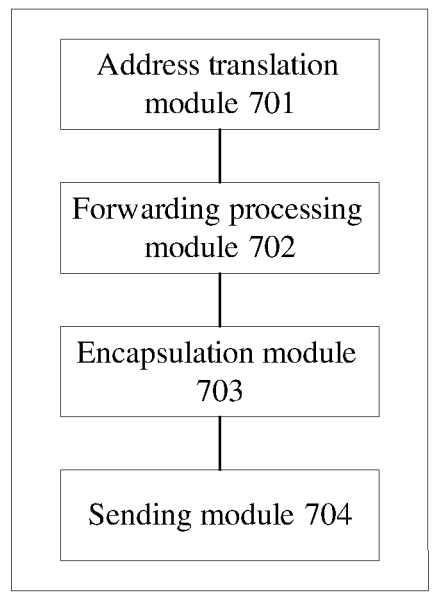
FIG. 7 is a schematic structural diagram of a packet forwarding apparatus according to an embodiment of this application.

Referring to FIG. 7, FIG. 7 is a packet forwarding apparatus 700 according to an embodiment of the present disclosure. The apparatus is deployed in a network node 70 in a low-rate wireless mesh network, and configured to implement the packet forwarding methods shown in FIG. 5 and FIG. 6 of this application. The packet forwarding apparatus 700 includes: an address translation module 701 configured to obtain a first original MAC address based on a first source IPv6 address of a first IPv6 packet, and obtain a first final MAC address based on a first destination IPv6 address of the first IPv6 packet, where the first original MAC address is a MAC address of the network node 70, and the first final MAC address is a MAC address of a final node; a forwarding processing module 702 configured to obtain a MAC address of a first next-hop node based on the first final MAC address; an encapsulation module 703 configured to generate a first data frame based on the first IPv6 packet, where the first data frame includes a first 6LoWPAN compressed IPv6 packet, and a first MAC header and a first layer-2 forwarding header that are located in an outer layer of the first 6LoWPAN compressed IPv6 packet, the first layer-2 forwarding header includes the first original MAC address and the first final MAC address, the first MAC header includes a first source MAC address and a first destination MAC address, the first source MAC address is the MAC address of the network node 70, and the first destination MAC address is the MAC address of the first next-hop node; and a sending module 704 configured to send the first data frame to the first next-hop node, so that the first next-hop node forwards the first data frame directly based on the first layer-2 forwarding header (specifically based on the first final MAC address).

Optionally, the MAC header of the first data frame further includes a layer-2 forwarding header identifier, used to indicate whether the first data frame includes the layer-2 forwarding header.

Specifically, the encapsulation module 703 compresses the first IPv6 packet according to the 6LoWPAN protocol, and encapsulates a first 6LoWPAN compressed header to obtain the first 6LoWPAN compressed IPv6 packet, where the first 6LoWPAN compressed header includes a first source address compression flag and a first destination address compression flag, the first source address compression flag is used to indicate whether the first source IPv6 address is compressed, and the first destination address compression flag is used to indicate whether the first destination IPv6 address is compressed. Optionally, when link layer encryption needs to be performed according to IEEE 802.15.4, the encapsulation module 703 encrypts the first 6LoWPAN compressed IPv6 packet according to an encryption mechanism of IEEE 802.15.4, and adds an appended security header (the appended security header is located in an outer layer of the first 6LoWPAN compressed header). Finally, the encapsulation module 703 encapsulates the first layer-2 forwarding header and the first MAC header in the outer layer (that is, the outer layer of the appended security header) of the first 6LoWPAN compressed IPv6 packet that is encrypted to obtain the first data frame. For a structure of the first data frame, refer to FIG. 2.

The encapsulation module 703 is configured to: when the first source IPv6 address is an address of a node in the low-rate wireless mesh network, and the first destination IPv6 address is an address of a node in the low-rate wireless mesh network, compress the first source IPv6 address and the first destination IPv6 address, and cause the first source address compression flag in the first 6LoWPAN compressed header to indicate that the first source IPv6 address is compressed, and the first destination address compression flag to indicate that the first destination IPv6 address is compressed; when the first source IPv6 address is an address of a node in the low-rate wireless mesh network, but the first destination IPv6 address is not an address of a node in the low-rate wireless mesh network, compress the first source IPv6 address, and cause the first source address compression flag in the first 6LoWPAN compressed header to indicate that the first source IPv6 address is compressed, and the first destination address compression flag to indicate that the first destination IPv6 address is not compressed, where the first 6LoWPAN compressed IPv6 packet further includes an inner IPv6 field, and the inner IPv6 field includes the first destination IPv6 address; or when the first source IPv6 address is not an address of a node in the low-rate wireless mesh network, but the first destination IPv6 address is an address of a node in the low-rate wireless mesh network, compress the first destination IPv6 address of the IPv6 packet, and cause the first source address compression flag in the first 6LoWPAN compressed header to indicate that the first source IPv6 address is not compressed, and the first destination address compression flag to indicate that the first destination IPv6 address is compressed, where the first 6LoWPAN compressed IPv6 packet further includes an inner IPv6 field, and the inner IPv6 field includes the first source IPv6 address.

The forwarding processing module 702 is configured to query a layer-2 forwarding table of the network node 70 based on the first final MAC address, to obtain the MAC address of the first next-hop node. The layer-2 forwarding table includes one or more entries, and each entry is a correspondence between the final MAC address and the MAC address of the next-hop node. An entry in the layer-2 forwarding table stores a correspondence between the first final MAC address and the MAC address of the first next-hop node.

Optionally, the apparatus further includes an entry translation module configured to translate a layer-3 routing table of the network node into the layer-2 forwarding table based on a correspondence between an IPv6 address and a MAC address of each node in the low-rate wireless mesh network.

Optionally, the packet forwarding apparatus 700 further includes an address learning module configured to: receive a first DAO packet or a first DIO packet sent by the final node, and obtain a correspondence between an IPv6 address of the final node and the MAC address of the final node from the first DAO packet or the first DIO packet; and receive a second DAO packet or a second DIO packet sent by the first next-hop node, and obtain a correspondence between an IPv6 address of the first next-hop node and the MAC address of the first next-hop node from the second DAO packet or the second DIO packet.

Optionally, the packet forwarding apparatus 700 further includes a route advertisement module configured to send a third DAO packet or a third DIO packet, where the third DAO packet or the third DIO packet includes an IPv6 address and the MAC address of the network node, so that a node receiving the third DAO packet or the third DIO packet obtains a correspondence between the IPv6 address of the network node and the MAC address of the network node.

Figure 8:
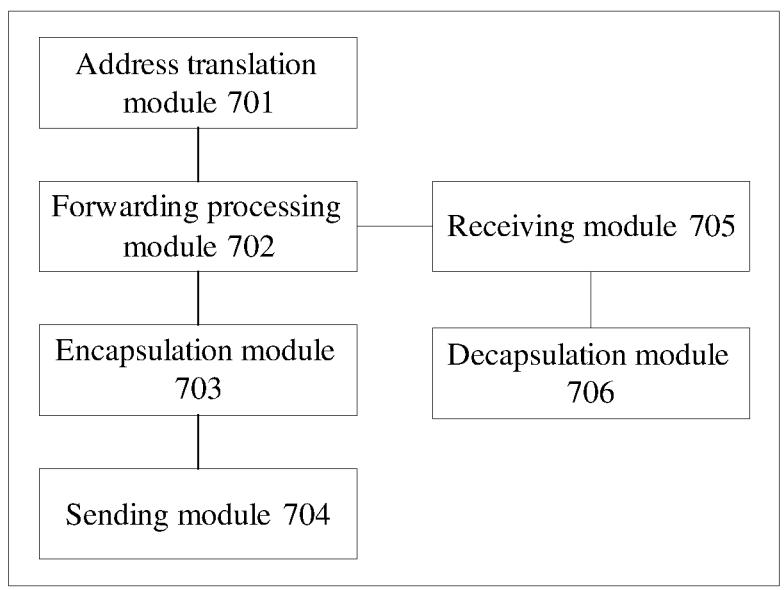
FIG. 8 is a schematic structural diagram of another packet forwarding apparatus according to an embodiment of this application.

As shown in FIG. 8, the packet forwarding apparatus 700 further includes a receiving module 705 and a decapsulation module 706.

The receiving module 705 is configured to receive a second data frame, where the second data frame includes a second 6LoWPAN compressed IPv6 packet, and a second MAC header and a second layer-2 forwarding header that are located in an outer layer of the second 6LoWPAN compressed IPv6 packet, the second MAC header includes a second source MAC address and a second destination MAC address, and the second layer-2 forwarding header includes a second original MAC address and a second final MAC address.

The forwarding processing module 702 is further configured to: when the second final MAC address is not the MAC address of the network node 70, obtain a MAC address of a second next-hop node based on the second final MAC address; and update the second source MAC address to the MAC address of the network node 70, and update the second destination MAC address to the MAC address of the second next-hop node.

The sending module 704 is further configured to send the second data frame to the second next-hop node.

The decapsulation module 706 is configured to: when the second final MAC address is the MAC address of the network node 70, decapsulate the second data frame to obtain a second IPv6 packet. Specifically, the decapsulation module 706 removes link layer encapsulation of the second data frame to obtain the second 6LoWPAN compressed IPv6 packet, where the second 6LoWPAN compressed IPv6 packet includes a second 6LoWPAN compressed header, the second 6LoWPAN compressed header includes a second source address compression flag and a second destination address compression flag, the second source address compression flag is used to indicate whether a second source IPv6 address is compressed, and the second destination address compression flag is used to indicate whether a second destination IPv6 address is compressed. Then, the decapsulation module 706 decompresses the second compressed IPv6 packet based on the second layer-2 forwarding header and the second 6LoWPAN compressed header to obtain the second IPv6 packet.

That the decapsulation module 706 removes link layer encapsulation of the second data frame to obtain the second 6LoWPAN compressed IPv6 packet includes: removing the second MAC header and the second layer-2 forwarding header, and performing data link layer decryption (according to the IEEE 802.15.4 protocol) based on the appended security header to obtain the second 6LoWPAN compressed IPv6 packet.

That the decapsulation module 706 decompresses the second compressed IPv6 packet based on the second layer-2 forwarding header and the second 6LoWPAN compressed header to obtain the second IPv6 packet includes: decompressing the second 6LoWPAN compressed IPv6 packet by using a decompression mechanism specified in the 6LoWPAN protocol and based on the second source address compression flag and the second destination address compression flag in the second 6LoWPAN compressed header, the second original MAC address and/or the second final MAC address in the second layer-2 forwarding header, and an inner IPv6 field to obtain the second IPv6 packet. Specifically, when the second source address compression flag indicates that the second source IPv6 address is compressed, and the second destination address compression flag indicates that the second destination IPv6 address is compressed, the decapsulation module 706 obtains the second source IPv6 address of the second IPv6 packet based on the second original MAC address in the second layer-2 mesh header, and obtains the second destination IPv6 address of the second IPv6 packet based on the second final MAC address in the second layer-2 mesh header; when the second source address compression flag indicates that the second source IPv6 address is compressed, and the second destination address compression flag indicates that the second destination IPv6 address is not compressed, the decapsulation module 706 obtains the second source IPv6 address of the second IPv6 packet based on the second original MAC address in the second layer-2 mesh header, and obtains the second destination IPv6 address of the second IPv6 packet from the inner IPv6 field in the second 6LoWPAN compressed IPv6 packet; or when the second source address compression flag indicates that the second source IPv6 address is not compressed, and the second destination address compression flag indicates that the second destination IPv6 address is compressed, the decapsulation module 706 obtains the second destination IPv6 address of the second IPv6 packet based on the second final MAC address in the second layer-2 mesh header, and obtains the second source IPv6 address of the second IPv6 packet from the inner IPv6 field in the second 6LoWPAN compressed IPv6 packet.

The address learning module is further configured to receive a fourth DAO packet or a fourth DIO packet sent by the second next-hop node, and obtain a correspondence between an IPv6 address and the MAC address of the second next-hop node from the fourth DAO packet or the fourth DIO packet.

For content not described in detail in this embodiment, refer to the descriptions in the method embodiment shown in FIG. 5 or FIG. 6.

The packet forwarding apparatus that is provided in this embodiment of the present disclosure and that is deployed in the network node of the low-rate wireless mesh network can encapsulate the IPv6 packet into the data frame including the layer-2 forwarding header, and perform layer-2 forwarding on the data frame based on the layer-2 forwarding header. There is no need to perform decryption (optional) and decompression processing hop by hop to obtain the destination IPv6 address and perform layer-3 routing and then perform compression and encryption processing. This not only improves forwarding efficiency, but also can reduce processing overheads and power consumption of the network node to prolong a service life of a power supply, therefore improving performance of the network.

Figure 9:
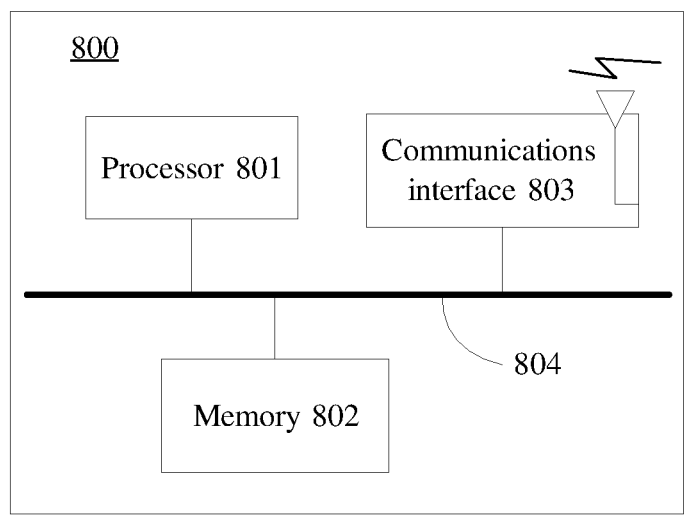
FIG. 9 is a schematic structural diagram of a network node according to an embodiment of this application.

Referring to FIG. 9, FIG. 9 is a network node 800 according to an embodiment of the present disclosure. The network node 800 is configured to implement the packet forwarding methods in the embodiments shown in FIG. 5 and FIG. 6 in the present disclosure in a low-rate wireless mesh network. The network node 800 includes a processor 801, a memory 802, and a communications interface 803.

The processor 801, the memory 802, and the communications interface 803 may be interconnected by a bus 804. The bus may include an address bus, a data bus, a control bus, or the like. For ease of indicating, the bus in FIG. 8 is indicated by only a bold line. However, this does not mean that only one bus or one type of bus exists.

The communications interface 803 is a communications interface between the network node 800 and another node. The communications interface 803 includes a wireless communications interface, also referred to as a radio frequency (RF) interface, and works in 160 megahertz (MHz) to 1 gigahertz (GHz) frequency bands, and a 2.4 GHz frequency band. The wireless communications interface includes an antenna configured to receive and transmit radio frequency signals. The wireless communications interface may be a WLAN interface, a cellular network communications interface, a Bluetooth interface, a ZigBee interface, a combination thereof, or the like. When the network node 800 is a BR in the low-rate wireless mesh network, the communications interface 803 may further include a wired communications interface, for example, an Ethernet interface. The Ethernet interface may be an optical interface, an electrical interface, or a combination thereof. For ease of description, in this application, the interface is represented by the communications interface 803. However, the technical solution of this application is not limited thereto.

The processor 801 may be a central processing unit (CPU), a network processor (NP), an MCU, or a combination thereof. The processor 801 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The processor 801 is configured to perform one or more steps in FIG. 5 or FIG. 6 to implement the packet forwarding method provided in the embodiments of the present disclosure.

Specifically, the processor 801 is configured to: obtain a first original MAC address based on a first source IPv6 address of a first IPv6 packet, and obtain a first final MAC address based on a first destination IPv6 address of the first IPv6 packet, where the first original MAC address is a Media Access Control MAC address of the network node, and the first final MAC address is a MAC address of a final node; obtain a MAC address of a first next-hop node based on the first final MAC address; generate a first data frame based on the first IPv6 packet, where the first data frame includes a first IPv6 over Low-Power Wireless Personal Area Network 6LoWPAN compressed IPv6 packet, and a first MAC header and a first layer-2 forwarding header that are located in an outer layer of the first 6LoWPAN compressed IPv6 packet, the first layer-2 forwarding header includes the first original MAC address and the first final MAC address, the first MAC header includes a first source MAC address and a first destination MAC address, the first source MAC address is the MAC address of the network node, and the first destination MAC address is the MAC address of the first next-hop node; and send the first data frame to the first next-hop node by using the communications interface 803, so that the first next-hop node forwards the first data frame directly based on the first final MAC address in the first layer-2 forwarding header.

Specifically, the processor 801 queries a layer-2 forwarding table of the network node based on the first final MAC address, to obtain the MAC address of the first next hop node, where the layer-2 forwarding table includes a correspondence between the first final MAC address and the MAC address of the first next-hop node.

The processor 801 is further configured to translate a layer-3 routing table of the network node 800 into the layer-2 forwarding table based on a correspondence between an IPv6 address and a MAC address of each node in the low-rate wireless mesh network.

The memory 802 is configured to store the layer-3 routing table and the layer-2 forwarding table. The memory 802 may be further configured to store the correspondence between the IPv6 address and the MAC address.

The memory 802 may include a volatile memory, for example, a random-access memory (RAM). The memory 802 may also include a non-volatile memory, for example, a flash memory, a hard disk drive (HDD), or a solid-state drive (SSD). The memory 802 may further include a combination of the foregoing types of memories.

The processor 801 is further configured to: receive a second data frame by using the communications interface 803, where the second data frame includes a second 6LoWPAN compressed IPv6 packet, and a second MAC header and a second layer-2 forwarding header that are located in an outer layer of the second 6LoWPAN compressed IPv6 packet, the second MAC header includes a second source MAC address and a second destination MAC address, and the second layer-2 forwarding header includes a second original MAC address and a second final MAC address; and when the second final MAC address is not the MAC address of the network node, obtain a MAC address of a second next-hop node based on the second final MAC address; update the second source MAC address to the MAC address of the network node, and update the second destination MAC address to the MAC address of the second next-hop node; and send the second data frame to the second next-hop node by using the communications interface 803; or when the second final MAC address is the MAC address of the network node, remove link layer encapsulation of the second data frame to obtain the second 6LoWPAN compressed IPv6 packet, where the second 6LoWPAN compressed IPv6 packet includes a second 6LoWPAN compressed header, the second 6LoWPAN compressed header includes a second source address compression flag and a second destination address compression flag, the second source address compression flag is used to indicate whether a second source IPv6 address is compressed, and the second destination address compression flag is used to indicate whether a second destination IPv6 address is compressed; and decompress the second 6LoWPAN compressed IPv6 packet based on the second layer-2 forwarding header and the second 6LoWPAN compressed header to obtain a second IPv6 packet.

Optionally, the memory 802 is further configured to store a program instruction; and the processor 801 may invoke the program instruction stored in the memory 802 to perform one or more steps in FIG. 5 or FIG. 6 to implement the packet forwarding method provided in the embodiments of the present disclosure.

For content not described in detail in this embodiment, refer to the descriptions in the method embodiment shown in FIG. 5 or FIG. 6.

The foregoing descriptions are merely specific examples of embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet forwarding method implemented by a network node in a low-rate wireless mesh network, the packet forwarding method comprising:
   obtaining an original medium access control (MAC) address of the network node based on a source Internet Protocol version 6 (IPv6) address of an IPv6 packet, wherein the network node is an original node of the IPv6 packet in the low-rate wireless mesh network;
   obtaining a final MAC address of a final node based on a destination IPv6 address of the IPv6 packet, wherein the final MAC address is a MAC address of the final node of the IPv6 packet in the low-rate wireless mesh network;

obtaining a next-hop MAC address of a next-hop node based on the final MAC address;

generating a data frame based on the IPv6 packet, wherein the data frame comprises an IPv6 over Low-Power Wireless Personal Area Network (6LoWPAN) compressed IPv6 packet, wherein the 6LoWPAN compressed IPv6 packet comprises an outer layer, wherein the outer layer comprises a layer-2 forwarding header and a MAC header, wherein the layer-2 forwarding header comprises the original MAC address and the final MAC address, wherein the MAC header comprises a source MAC address and a destination MAC address, wherein the source MAC address is the original MAC address, and wherein the destination MAC address is the next-hop MAC address;

sending the data frame to the next-hop node to prompt the next-hop node to forward the data frame based on the final MAC address; and querying a layer-2 forwarding table of the network node based on the final MAC address to obtain the next-hop MAC address, wherein the layer-2 forwarding table comprises a correspondence between the final MAC address and the next-hop MAC address, and wherein before querying the layer-2 forwarding table, the packet forwarding method further comprises translating a layer-3 routing table of the network node into the layer-2 forwarding table based on a correspondence between an IPv6 address and a MAC address of each node in the low-rate wireless mesh network.

2. The packet forwarding method of claim 1, further comprising:

compressing the IPv6 packet according to a 6LoWPAN protocol to obtain a 6LoWPAN compressed IPv6 packet comprising a 6LoWPAN compressed header, wherein the 6LoWPAN compressed header is encapsulated and comprises a source address compression flag and a destination address compression flag, wherein the source address compression flag indicates whether a source IPv6 address is compressed, and wherein the destination address compression flag indicates whether the destination IPv6 address is compressed; and encapsulating the layer-2 forwarding header and the MAC header to obtain the data frame.

3. The packet forwarding method of claim 2, further comprising:

compressing the source IPv6 address and causing the source address compression flag to indicate that the source IPv6 address is compressed when the source IPv6 address belongs to a node in the low-rate wireless mesh network;

causing the source address compression flag to indicate that the source IPv6 address is not compressed and causing the 6LoWPAN compressed IPv6 packet to further comprise an inner IPv6 field including the source IPv6 address when the source IPv6 address does not belong to a node in the low-rate wireless mesh network;

compressing the destination IPv6 address and causing the destination address compression flag to indicate that the destination IPv6 address is compressed when the destination IPv6 address belongs to a node in the low-rate wireless mesh network; and causing the destination address compression flag to indicate that the destination IPv6 address is not compressed and causing the 6LoWPAN compressed IPv6 packet to further comprise the inner IPv6 field including the destination IPv6 address when the destination IPv6 address does not belong to a node in the low-rate wireless mesh network.

4. The packet forwarding method of claim 1, wherein before obtaining, the packet forwarding method further comprises:

receiving a first destination advertisement object (DAO) packet or a first destination oriented directed acyclic graph information object (DIO) packet from the final node;

obtaining a correspondence between an IPv6 address of the final node and the final MAC address from the first DAO packet or the first DIO packet;

receiving a second DAO packet or a second DIO packet from the next-hop node; and obtaining a correspondence between an IPv6 address of the next-hop node and the next-hop MAC address from the second DAO packet or the second DIO packet.

5. The packet forwarding method of claim 1, wherein the low-rate wireless mesh network comprises a smart metering network.

6. The packet forwarding method of claim 1, wherein the low-rate wireless mesh network comprises a smart household network.

7. A packet forwarding method implemented by a network node in a low-rate wireless mesh network, the packet forwarding method comprising:

receiving a data frame, wherein the data frame comprises an Internet Protocol version 6 (IPv6) over Low-Power Wireless Personal Area Network (6LoWPAN) compressed IPv6 packet, wherein the 6LoWPAN compressed IPv6 packet comprises an outer layer, wherein the outer layer comprises a medium access control (MAC) header and a layer-2 forwarding header, wherein the MAC header comprises a source MAC address and a destination MAC address, wherein the layer-2 forwarding header comprises an original MAC address and a final MAC address, and wherein before receiving the data frame, the packet forwarding method comprises translating a layer-3 routing table of the network node into the layer-2 forwarding table based on a correspondence between an IP address and a MAC address of each node in the low-rate wireless mesh network;

obtaining a next-hop MAC address of a next-hop node based on the final MAC address when the final MAC address does not belong to the network node;

updating the source MAC address to a MAC address of the network node;

updating the destination MAC address to the next-hop MAC address; and sending the data frame to the next-hop node.

8. The packet forwarding method of claim 7, further comprising:

removing link layer encapsulation of the data frame to obtain the 6LoWPAN compressed IPv6 packet when the final MAC address is the MAC address, wherein the 6LoWPAN compressed IPv6 packet comprises a 6LoWPAN compressed header, wherein the 6LoWPAN compressed header comprises a source address compression flag and a destination address compression flag, wherein the source address compression flag indicates whether a source IPv6 address is compressed, and wherein the destination address compression flag indicates whether a destination IPv6 address is compressed; and decompressing the 6LoWPAN compressed IPv6 packet based on the layer-2 forwarding header and the 6LoWPAN compressed header to obtain an IPv6 packet.

9. The packet forwarding method according to claim 8, further comprising:
obtaining the source IPv6 address based on the original MAC address when the source address compression flag indicates that the source IPv6 address is compressed;
obtaining the source IPv6 address from an inner IPv6 field in the 6LoWPAN compressed IPv6 packet when the source address compression flag indicates that the source IPv6 address is not compressed;
obtaining the destination IPv6 address based on the final MAC address when the destination address compression flag indicates that the destination IPv6 address is compressed; and
obtaining the destination IPv6 address from the inner IPv6 field when the destination address compression flag indicates that the destination IPv6 address is not compressed.

10. The packet forwarding method of claim 7, wherein before translating, the packet forwarding method further comprises:
sending, to a receiving node, a first destination advertisement object (DAO) packet or a first destination oriented directed acyclic graph information object (DIO) packet comprising a first IPv6 address and the MAC address so that the receiving node obtains a correspondence between the first IPv6 address and the MAC address;
receiving, from the next-hop node, a second DAO packet or a second DIO packet; and
obtaining a correspondence between a second IPv6 address of the next-hop node and the next-hop MAC address from the second DAO packet or the second DIO packet.

11. The packet forwarding method of claim 7, wherein the low-rate wireless mesh network comprises a smart metering network.

12. The packet forwarding method of claim 7, wherein the low-rate wireless mesh network comprises a smart household network.

13. A network node in a low-rate wireless mesh network, the network node comprising:
a memory; and
a processor coupled to the memory and configured to:
obtain an original medium access control (MAC) address of the network node based on a source Internet Protocol version 6 (IPv6) address of an IPv6 packet, wherein the network node is an original node of the IPv6 packet in the low-rate wireless mesh network;
obtain a final MAC address of a final node based on a destination IPv6 address of the IPv6 packet, wherein the final MAC address is a MAC address of the final node of the IPv6 packet in the low-rate wireless mesh network;
obtain a next-hop MAC address of a next-hop node based on the final MAC address;
generate a data frame based on the IPv6 packet, wherein the data frame comprises an IPv6 over Low-Power Wireless Personal Area Network (6LoWPAN) compressed IPv6 packet, wherein the 6LoWPAN compressed IPv6 packet comprises an outer layer, wherein the outer layer comprises a layer-2 forwarding header and a MAC header, wherein the layer-2 forwarding header comprises the original MAC address and the final MAC address, wherein the MAC header comprises a source MAC address and a destination MAC address, wherein the source MAC address is the original MAC address, and wherein the destination MAC address is the next-hop MAC address;
send the data frame to the next-hop node to prompt the next-hop node to forward the data frame based on the final MAC address;
query a layer-2 forwarding table of the network node based on the final MAC address to obtain the next-hop MAC address, wherein the layer-2 forwarding table comprises a correspondence between the final MAC address and the next-hop MAC address; and
translate a layer-3 routing table of the network node into the layer-2 forwarding table based on a correspondence between an IPv6 address and a MAC address of each node in the low-rate wireless mesh network.

14. The network node of claim 13, wherein the processor is further configured to:
compress the IPv6 packet according to a 6LoWPAN protocol to obtain a 6LoWPAN compressed IPv6 packet comprising a 6LoWPAN compressed header, wherein the 6LoWPAN compressed header is encapsulated and comprises a source address compression flag and a destination address compression flag, wherein the source address compression flag indicates whether a source IPv6 address is compressed, and wherein the destination address compression flag indicates whether the destination IPv6 address is compressed; and
encapsulate the layer-2 forwarding header and the MAC header to obtain the data frame.

15. The network node of claim 14, wherein the processor is further configured to:
compress the source IPv6 address and causing the source address compression flag to indicate that the source IPv6 address is compressed when the source IPv6 address belongs to a node in the low-rate wireless mesh network;
cause the source address compression flag to indicate that the source IPv6 address is not compressed and causing the 6LoWPAN compressed IPv6 packet to further comprise an inner IPv6 field including the source IPv6 address when the source IPv6 address does not belong to a node in the low-rate wireless mesh network;
compress the destination IPv6 address and causing the destination address compression flag to indicate that the destination IPv6 address is compressed when the destination IPv6 address belongs to a node in the low-rate wireless mesh network; and
cause the destination address compression flag to indicate that the destination IPv6 address is not compressed and causing the 6LoWPAN compressed IPv6 packet to further comprise the inner IPv6 field including the destination IPv6 address when the destination IPv6 address does not belong to a node in the low-rate wireless mesh network.

16. The network node of claim 13, further comprising an address learning module, wherein the address learning module is configured to:
receive a first destination advertisement object (DAO) packet or a first destination oriented directed acyclic graph information object (DIO) packet from the final node;

obtain a correspondence between an IPv6 address of the final node and the final MAC address from the first DAO packet or the first DIO packet;

receive a second DAO packet or a second DIO packet from the next-hop node; and obtain a correspondence between an IPv6 address of the next-hop node and the next-hop MAC address from the second DAO packet or the second DIO packet.

17. The network node of claim 13, wherein the processor is further configured to:

receive a second data frame comprising a second 6LoWPAN compressed IPv6 packet, wherein the second 6LoWPAN compressed IPv6 packet comprises a second outer layer, wherein the second outer layer comprises a second layer-2 forwarding header and a second MAC header, wherein the second layer-2 forwarding header comprises a second original MAC address and a second final MAC address, and wherein the second MAC header comprises a second source MAC address and a second destination MAC address;

obtain a second next-hop MAC address of a second next-hop node based on the second final MAC address, update the second source MAC address to the second original MAC address, and update the second destination MAC address to the second next-hop MAC address when the second final MAC address is not the second original MAC address; and send the second data frame to the second next-hop node.

18. The network node of claim 17, wherein the processor is further configured to:

remove link layer encapsulation of the second data frame to obtain the second 6LoWPAN compressed IPv6 packet when the second final MAC address is the original MAC address, wherein the second 6LoWPAN compressed IPv6 packet comprises a second 6LoWPAN compressed header, wherein the second 6LoWPAN compressed header comprises a second source address compression flag and a second destination address compression flag, wherein the second source address compression flag indicates whether a second source IPv6 address is compressed, and wherein the second destination address compression flag indicates whether a second destination IPv6 address is compressed; and decompress the second 6LoWPAN compressed IPv6 packet based on the second layer-2 forwarding header and the second 6LoWPAN compressed header to obtain a second IPv6 packet.

19. The network node of claim 18, wherein the processor is further configured to:

obtain the second source IPv6 address based on the second original MAC address when the second source address compression flag indicates that the second source IPv6 address is compressed;

obtain the second source IPv6 address from an inner IPv6 field in the second 6LoWPAN compressed IPv6 packet when the second source address compression flag indicates that the second source IPv6 address is not compressed;

obtain the second destination IPv6 address based on the second final MAC address when the second destination address compression flag indicates that the second destination IPv6 address is compressed; and obtain the second destination IPv6 address from the inner IPv6 field when the second destination address compression flag indicates that the second destination IPv6 address is not compressed.

20. The network node of claim 13, wherein the low-rate wireless mesh network comprises a smart metering network or a smart household network.

* * * * *

UNITED STATES PATENT AND TRADEMARK OFFICE
CERTIFICATE OF CORRECTION

PATENT NO. : 11,109,269 B2  
APPLICATION NO. : 16/426808  
DATED : August 31, 2021  
INVENTOR(S) : Yuefeng Wu and Yifan Wu Page 1 of 1

It is certified that error appears in the above-identified patent and that said Letters Patent is hereby corrected as shown below:

On the Title Page

Page 2, item (56) References Cited, Other Publications: "Ahmood, D. "Analyzing and Evaluating" should read "Mahmood, D. "Analyzing and Evaluating"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*